(12) United States Patent
Kishimoto

(10) Patent No.: US 9,001,364 B2
(45) Date of Patent: Apr. 7, 2015

(54) MANAGEMENT SYSTEM, IMAGE FORMING APPARATUS, MANAGEMENT SYSTEM CONTROL METHOD, AND IMAGE FORMING APPARATUS CONTROL METHOD FOR MIGRATION OF SETTING VALUES OF AN APPLICATION THAT OPERATES IN THE IMAGE FORIMNG APPARATUS

(71) Applicant: Canon Kabushiki Kaisha, Tokyo (JP)

(72) Inventor: Hiroaki Kishimoto, Munster (DE)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 13/749,519

(22) Filed: Jan. 24, 2013

(65) Prior Publication Data

US 2013/0194630 A1     Aug. 1, 2013

(30) Foreign Application Priority Data

Jan. 26, 2012   (JP) ................. 2012-013801

(51) Int. Cl.
*G06F 3/12*     (2006.01)
*G06K 15/00*    (2006.01)

(52) U.S. Cl.
CPC ............ *G06F 3/1296* (2013.01); *G06F 3/1204* (2013.01); *G06F 3/123* (2013.01); *G06F 3/1285* (2013.01)

(58) Field of Classification Search
CPC ..... G06F 3/1296; G06F 3/1285; G06F 3/123; G06F 3/1204

USPC ................. 358/1.1, 1.9, 1.13, 1.15, 1.18, 402
See application file for complete search history.

(56) References Cited

U.S. PATENT DOCUMENTS

| 8,564,814 | B2 * | 10/2013 | Kono ........................... | 358/1.15 |
| 8,867,074 | B2 * | 10/2014 | Nishikawa ................... | 358/1.15 |
| 2007/0046996 | A1 * | 3/2007 | Matsuda ...................... | 358/1.18 |
| 2008/0239373 | A1 * | 10/2008 | Suzuki ......................... | 358/1.15 |
| 2011/0102830 | A1 * | 5/2011 | Naitoh ......................... | 358/1.15 |

FOREIGN PATENT DOCUMENTS

JP        2009-164902 A        7/2009

* cited by examiner

*Primary Examiner* — Gabriel Garcia
(74) *Attorney, Agent, or Firm* — Canon U.S.A., Inc. IP Divison

(57) ABSTRACT

An image forming apparatus receives at least one setting file including a first item for specifying an application and a second item for specifying an operation target setting content from a server apparatus. If a value specifying an application is set in the first item included in the received setting file, the image forming apparatus operates a setting value of the application according to a value set in the second item included in the received setting file. If a predetermined value defined for operating a setting value of the image forming apparatus is set in the first item included in the received setting file, the image forming apparatus operates the setting value of the image forming apparatus by using a value set in the second item included in the received setting file. The image forming apparatus transmits an operation result to the server apparatus.

13 Claims, 18 Drawing Sheets

FIG.5

```
@ApplicationIds: 11111111-1111-1111-1111-111111111111  ~502
@ApplicationName: XYZ Login  ~503
@ApplicationVersion: 1.*  ~504
@RequireSystemSettings: true  ~505 export: cm/pid/authServer  ~506
export: cm/pid/logLevel  ~507
export: cm/pid/securityLevel  ~508 export: sys/auth/ils  ~509
set: sys/nw/tcpip/https = 1  ~510
set: sys/ext/usb/systemdrv/hid = 0  ~511
set: sys/dev/print/outtray = 1  ~512
set: sys/dev/copy/outtray = 2  ~513
export: sys/auth/admin/id  ~514
export_enc: sys/auth/admin/passwd  ~515
export: sys/nw/tcpip/dns/server  ~516
export: sys/nw/tcpip/dns/domain  ~517
export: sys/nw/tcpip/proxy/http  ~518
```
501

@ApplicationIds: 00000000-0000-0000-0000-000000000000 ~602
@ApplicationName: ~603
@ApplicationVersion: c8ccc44081a511d6a44b005004d0f31a-0100 ~604
@ApplicationDisplayName: C1234 ~605
@ApplicationDescription: XYZ COLOR COPY 1234 ~606 export: sys/auth/ils, ils:/// ~607
export: sys/dev/print/outtray, pos://0.1.0.1 ~608
export: sys/dev/copy/outtray, pos://0.1.1.1 ~609
export: sys/ext/usb/systemdrv/hid, pos://0.2.0.1.0 ~610
export: sys/auth/admin/id, pos://0.3.1.1 ~611
export_enc: sys/auth/admin/passwd, pos://0.3.1.2 ~612
export: sys/nw/tcpip/https, pos://0.4.1.1 ~613
export: sys/nw/tcpip/dns/server, pos://0.4.1.2.3 ~614
export: sys/nw/tcpip/dns/domain, pos://0.4.1.2.4 ~615
export: sys/nw/tcpip/proxy/http, pos://0.4.1.3.1 ~616
. . . .

@ApplicationIds: 00000000-0000-0000-0000-000000000000 ~702
@ApplicationName: ~703
@ApplicationVersion:4b0dd32f83ac467e8e0bff20c7dd8824-0100 ~704
@ApplicationDisplayName: C0101 ~705
@ApplicationDescription: XYZ COPY 0101 ~706 export: sys/auth/ils, ils:/// ~707
export: sys/dev/print/outtray, pos://0.2.0.1 ~708
export: sys/dev/copy/outtray, pos://0.2.1.1 ~709
export: sys/ext/usb/systemdrv/hid, pos://0.5.0.1.0 ~710
export: sys/auth/admin/id, pos://0.3.1.2 ~711
export_enc: sys/auth/admin/passwd, pos://0.3.1.3 ~712
export: sys/nw/tcpip/https, pos://0.4.1.2 ~713
export: sys/nw/tcpip/dns/server, pos://0.4.1.2.3 ~714
export: sys/nw/tcpip/dns/domain, pos://0.4.1.2.4 ~715
export: sys/nw/tcpip/proxy/http, pos://0.4.1.3.5 ~716
. . . .

FIG.11

Error: Setting file for export destination device is needed.

Back

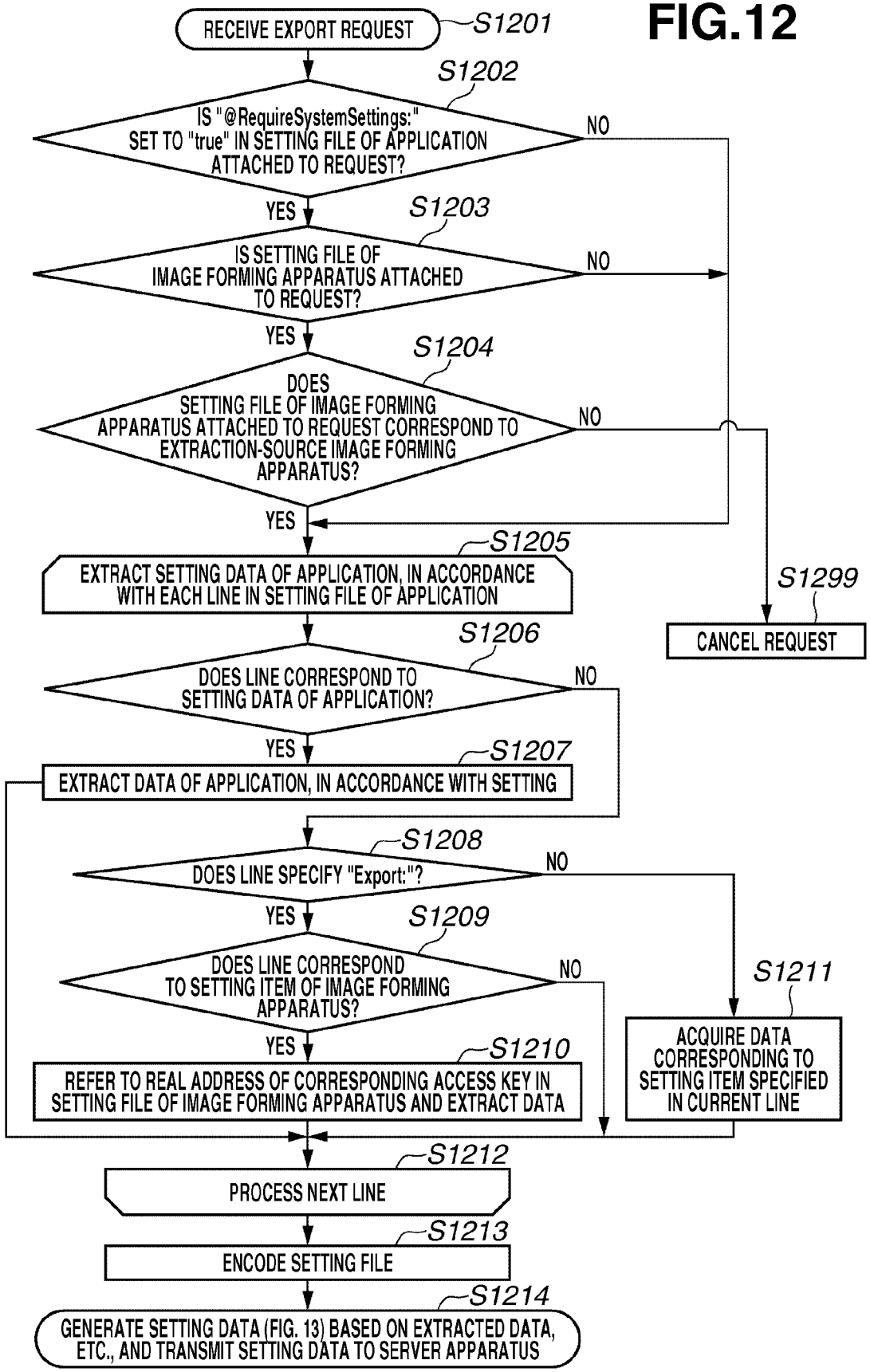

FIG.13

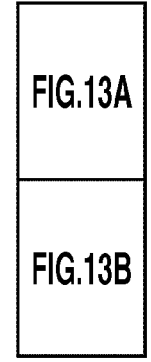

FIG.13A

```
1301
<exportdata>
    <info>
        <id>00000000-0000-0000-0000-000000000000</id>  ~1310    ~1302
        <version>c8ccc44081a511d6a44b005004d0f31a-0100</version>
    </info>                                              1311
    <dataset>
    <item>
            <key>sys/auth/ils</key>  ~1312
            <name>id</name>
            <type>Integer</type>  ~1313
            <value>001</value>  ~1314
    </item>
    <item>
            <key>sys/dev/print/outtray</key>  ~1315
            <name>tray for print</name>
            <type>Integer</type>  ~1316
            <value>1</value>  ~1317
    </item>
    <item>
            <key>sys/dev/copy/outtray</key>  ~1318
            <name>tray for copy</name>
            <type>Integer</type>  ~1319
            <value>2</value>  ~1320
    </item>
    <item>
            <key>sys/ext/usb/systemdrv/hid</key>  ~1321
            <name>System driver for HID</name>
            <type>Boolean</type>  ~1322
            <value>true</value>  ~1323
    </item>
    ...
    </dataset>
</exportdata>
```

FIG.13B

```
<exportdata>
    <info>
        <id>11111111-1111-1111-1111-111111111111</id>  ~1351
        <version>1.0</version>
    </info>
    <dataset>
    <item>
            <key>cm/pid/authServer</key>  ~1352
            <name>Authentication Server</name>
            <type>String</type>  ~1353
            <value>192.168.1.2</value>  ~1354
    </item>
    <item>
            <key>cm/pid/logLevel</key>  ~1355
            <name>Log level</name>
            <type>String</type>  ~1356
            <value>error</value>  ~1357
    </item>
    <item>
            <key>cm/pid/securityLevel</key>  ~1358
            <name>Security Level</name>
            <type>String</type>  ~1359
            <value>high</value>  ~1360
    </item>
    ...
    </dataset>
</exportdata>
```

1303

1304

```
<settingdata>
QEFwcGxpY2F0aW9uSWRzOiAxMTExMTExMS0xMTExLTExMTEtMTExMSOxMTExMTExMTExMTExDQpAQXBwbGljYXRpb25OYW1lOi
BYWVogTG9naW4NCkBBcHBsaWNhdGlvbiZlcnNpb246IDEuKg0KQFJlcXVpcmVkVTeXN0ZW1TZXR0aW5nczogdHJ1ZQ0KDQpleHBvcnQ
6IGNtL3BpZC9hdXRoXRoLU2VydmVyDQpleHBvcnQ6IGNtL3BpZC9sb2dMZXZlbA0KZXhwb3J0OiBjbS9waWQvc2VjdXJpdHlMZXZlbA0KDQ
pleHBvcnQ6IHNjy9hdXRoLzlscw0Kc2V0OiBzeXMvbncvdGNnwaXAvaHR0cHMgPSAxDQpzZXQ6IHN5c9leHQvdXNIL3N5c3RIbWRydi
9oaWQgPSAwDQpzZXQ6IHNjy9kZXvoHJpbnQvb3VdHJheSA9IDENCnNldDogc3IzL2RldlI9jb3B5L291dHRyYXkgPSAyDQpleHBvcn
Q6IHN5cy9hdXRoL2FkbWluL2lkDQpleHBvcnRfZW5jOiBzeXMvYXV0aC9hZG1pbi9wYXNzd2QgDQpleHBvcnQ6IHN5cy9udy90Y3BpcC9
kbnMvc2VydmVyDQpleHBvcnQ6IHN5cy9udy90Y3BpcC9kbnMvZG9tYWluDQpleHBvcnQ6IHN5cy9udy90Y3BpcC9wcm94eS9odHRwDQ
o=
</settingdata>
```

FIG.15

Error: Setting file for import destination device is needed.

Back

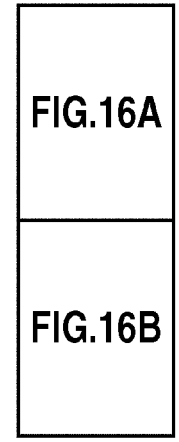
FIG.16
FIG.16A
FIG.16B
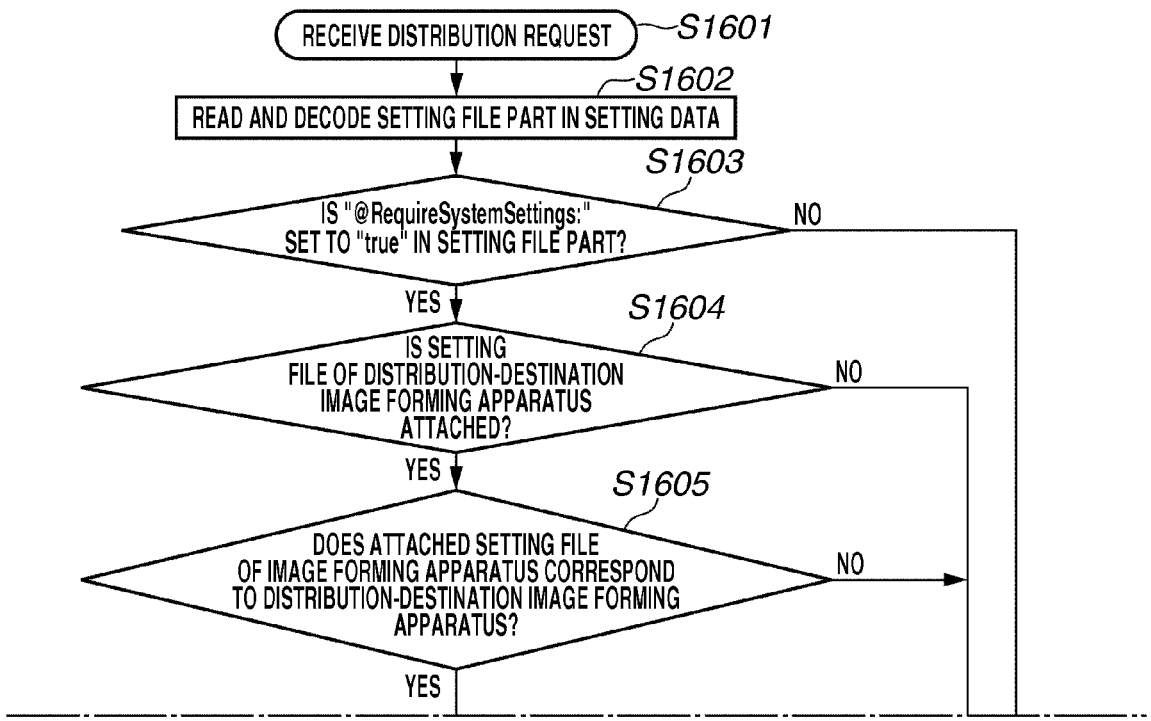
FIG.16A

MANAGEMENT SYSTEM, IMAGE FORMING APPARATUS, MANAGEMENT SYSTEM CONTROL METHOD, AND IMAGE FORMING APPARATUS CONTROL METHOD FOR MIGRATION OF SETTING VALUES OF AN APPLICATION THAT OPERATES IN THE IMAGE FORIMNG APPARATUS

BACKGROUND OF THE INVENTION

1. Field of the Invention

The present invention relates to migration of setting values of an application that operates in an image forming apparatus and setting values of an image forming apparatus main body.

2. Description of the Related Art

Japanese Patent Application Laid-Open No. 2009-164902 discusses a technique for preventing loss of setting information about an image forming apparatus when firmware is updated. According to this technique, when firmware is updated, if map information about setting values is changed, a setting migration program is simultaneously installed. This setting migration program determines a correspondence relationship between the map information before the update and the map information after the update and migrates the setting values.

This technique discussed in Japanese Patent Application Laid-Open No. 2009-164902 is directed to accurate migration of setting values even when map information (storage location) about setting values of an image forming apparatus main body is changed due to change of firmware.

Thus, the technique discussed in Japanese Patent Application Laid-Open No. 2009-164902 only assumes migration of setting values in an image forming apparatus when firmware is updated. Thus, the technique cannot be applied when setting values are migrated or changed due to other reasons.

For example, when a new application is added or when an application is updated in an image forming apparatus, there are cases where certain setting values of the image forming apparatus need to be changed for an operation of the application (setting values of the image forming apparatus main body that relate to the application).

More specifically, when Hypertext Transfer Protocol (HTTP) communication to a newly added or updated application needs to be improved to a higher security level, all the HTTP communication to the image forming apparatus needs to be set to HTTPS communication.

In addition, when single account information in an image forming apparatus is allocated for an operation of a certain application, appropriate account information that exists in the image forming apparatus needs to be allocated accurately.

In addition, setting needs to be made so that a certain application gives priority to a driver controlling an external apparatus such as a universal serial bus (USB) device connected to an image forming apparatus over a driver installed on the image forming apparatus.

In addition, when a certain application operates, administrator settings need to be activated to restrict use of an image forming apparatus, so that users without administrator authority cannot operate the image forming apparatus.

In addition, when a certain application refers to communication proxy server settings based on a certain protocol such as HTTP in an image forming apparatus, the settings need to be set in an appropriate proxy server.

In addition, when a certain application is activated, discharge bins of an image forming apparatus need to be set separately depending on the job type such as a print job or a copy job.

Thus, there are many cases where setting values of an image forming apparatus main body are changed depending on an application added to or updated in an image forming apparatus.

Since such setting values are changed by a request from an application added to the image forming apparatus or by an assumed use environment, a change of firmware or change of map information about setting values in the image forming apparatus is not always associated.

Thus, even when firmware or map information about setting values in the image forming apparatus is not changed, there are cases where setting values in the image forming apparatus need to be changed depending on a request from an application installed on the image forming apparatus.

In addition, migration of setting values associated with a request from an application is not always caused only within a single image forming apparatus. Thus, when a setting of an application is extracted from a first image forming apparatus and the setting is migrated to a second image forming apparatus, there are cases where setting values of the first image forming apparatus are migrated to the second image forming apparatus. In this way, a labor for setting can be reduced.

In such case, there are cases where the same setting values are set in different models. However, if the map information about setting values is different between the models, the setting values cannot be set accurately in the migration destination apparatus. Under such circumstances, a program (migration program) that interprets a map of each model and accurately migrates setting values is needed for each model. Thus, users are required to execute very cumbersome work of acquiring a migration program for each model and installing the programs for each of the models of a plurality of image forming apparatuses in advance prior to addition of an application and migration of setting values.

SUMMARY OF THE INVENTION

The present invention is directed to a method for enabling an operation of setting values of an application installed on an image forming apparatus or setting values of the image forming apparatus main body relating to the application without requiring a complex operation such as installing a migration program on the image forming apparatus for each model, irrespective of the update timing of firmware of the image forming apparatus and enabling migration of such setting values to be migrated within a single image forming apparatus or among a plurality of different image forming apparatuses flexibly and easily (even among image forming apparatuses of different types).

According to an aspect of the present invention, there is provided a management system including a server apparatus and at least one image forming apparatus configured to be capable of installing at least one application thereon. The server apparatus and the at least one image forming apparatus are capable of communicating with each other. The server apparatus includes a setting file transmission unit configured to transmit at least one setting file including a first item for specifying an application and a second item for specifying an operation target setting content to any one of the at least one image forming apparatus. Each of the at least one image forming apparatus includes a reception unit configured to receive at least one setting file including a first item for specifying an application and a second item for specifying an operation target setting content from the server apparatus, an operation unit configured to operate, if a value specifying an application installed on the image forming apparatus is set in the first item included in the received setting file, a setting value of the application according to a value set in the second item included in the received setting file, and to operate, if a predetermined value defined for operating a setting value of the image forming apparatus, the predetermined value being different from a setting value for specifying an application, is set in the first item included in the received setting file, the setting value of the image forming apparatus by using a value set in the second item included in the received setting file, and a transmission unit configured to transmit a result of an operation by the operation unit to the server apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a setting file of an application.

FIG. 6 illustrates a setting file of an image forming apparatus.

FIG. 7 illustrates a setting file of an image forming apparatus.

FIG. 11 illustrates an error message displayed on a display apparatus displaying the operation screen in FIG. 4.

FIG. 12 is a flow chart illustrating a process executed by an agent of an image forming apparatus that has received an extraction request from the server apparatus.

FIG. 13, which is composed of FIGS. 13A and 13B, illustrates an excerpt of setting data transmitted to the server apparatus in step S1214 in FIG. 12.

FIG. 15 illustrates an error message.

DESCRIPTION OF THE EMBODIMENTS

Various exemplary embodiments, features, and aspects of the invention will be described in detail below with reference to the drawings.

Figure 1:
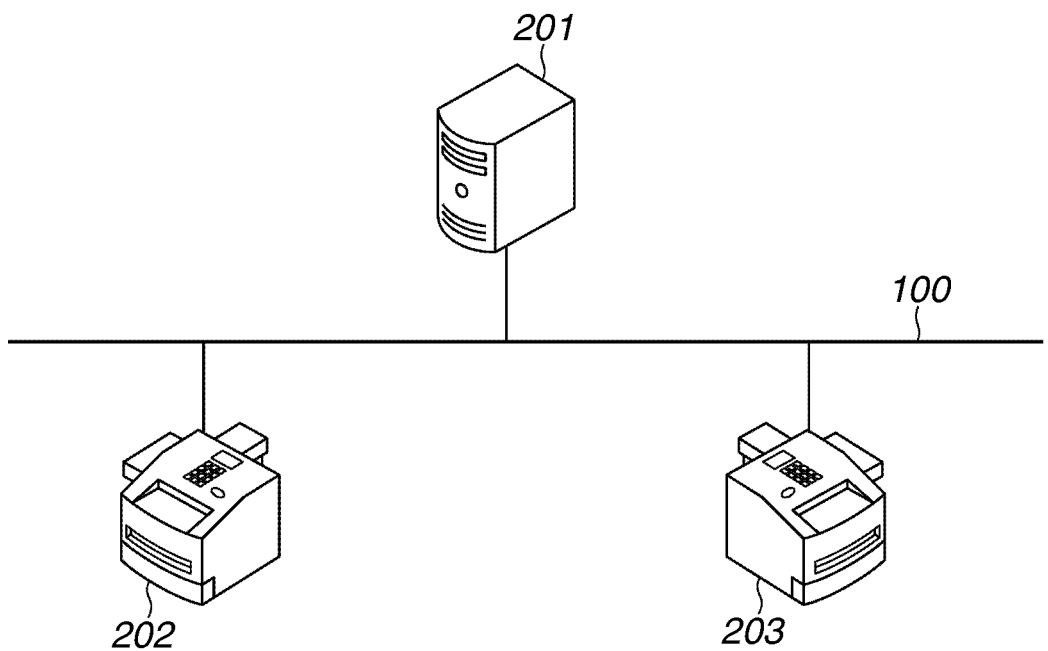
FIG. 1 illustrates a configuration of a management system according to an exemplary embodiment of the present invention.

FIG. 1 illustrates a configuration of a management system according to an exemplary embodiment of the present invention.

As illustrated in FIG. 1, in the management system according to the present exemplary embodiment, a server apparatus 201, an image forming apparatus 202, and an image forming apparatus 203 are connected to each other via a network 100 so that these apparatuses 201 to 203 can communicate with each other.

In this management system, the server apparatus 201 extracts setting data from an extraction-source image forming apparatus and stores and manages the extracted setting data. In addition, the server apparatus 201 can return the extracted setting data to the extraction-source image forming apparatus to set the setting data therein again. In addition, the server apparatus 201 can distribute the extracted setting data to another image forming apparatus to set the setting data therein. For example, the server apparatus 201 can extract setting data from the image forming apparatus 202 and distribute the extracted setting data to the image forming apparatus 203.

The server apparatus 201 has a configuration of a general computer apparatus. While internal units are not illustrated, the server apparatus 201 includes a central processing unit (CPU), a read-only memory (ROM), a random access memory (RAM), a network interface, and an external storage device (a hard disk drive (HDD)). By reading and executing programs stored in the HDD, the CPU of the server apparatus 201 realizes various functions of the server apparatus 201.

Figure 2:
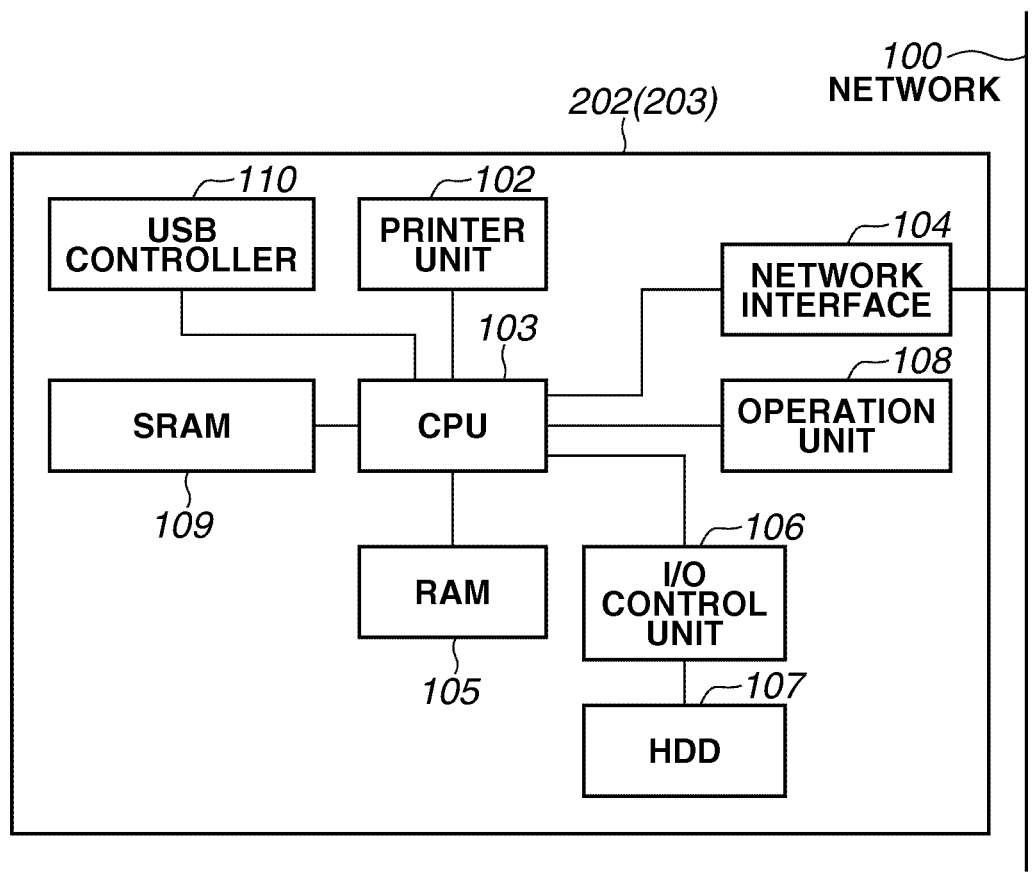
FIG. 2 is a block diagram illustrating a hardware configuration of an image forming apparatus illustrated in FIG. 1.

FIG. 2 illustrates a hardware configuration of the image forming apparatus 202/203.

FIG. 2 is a block diagram illustrating a hardware configuration of the image forming apparatus 202/203 in FIG. 1. While the image forming apparatuses 202 and 203 may be of the same model or different models, the present exemplary embodiment will be described assuming that the image forming apparatuses 202 and 203 are of different models.

As illustrated in FIG. 2, the image forming apparatus includes a CPU 103, a RAM 105, a network interface (NI) 104, a printer unit 102, an operation unit 108, a static random access memory (SRAM) 109, a USB controller 110, an input/output (I/O) control unit 106, and an HDD 107.

The CPU 103 are connected to the RAM 105, the NI 104, the printer unit 102, the operation unit 108, the SRAM 109, the USB controller 110, and the I/O control unit 106 via buses. In addition, the CPU 103 is connected to the HDD 107 via the I/O control unit 106.

Figure 3:
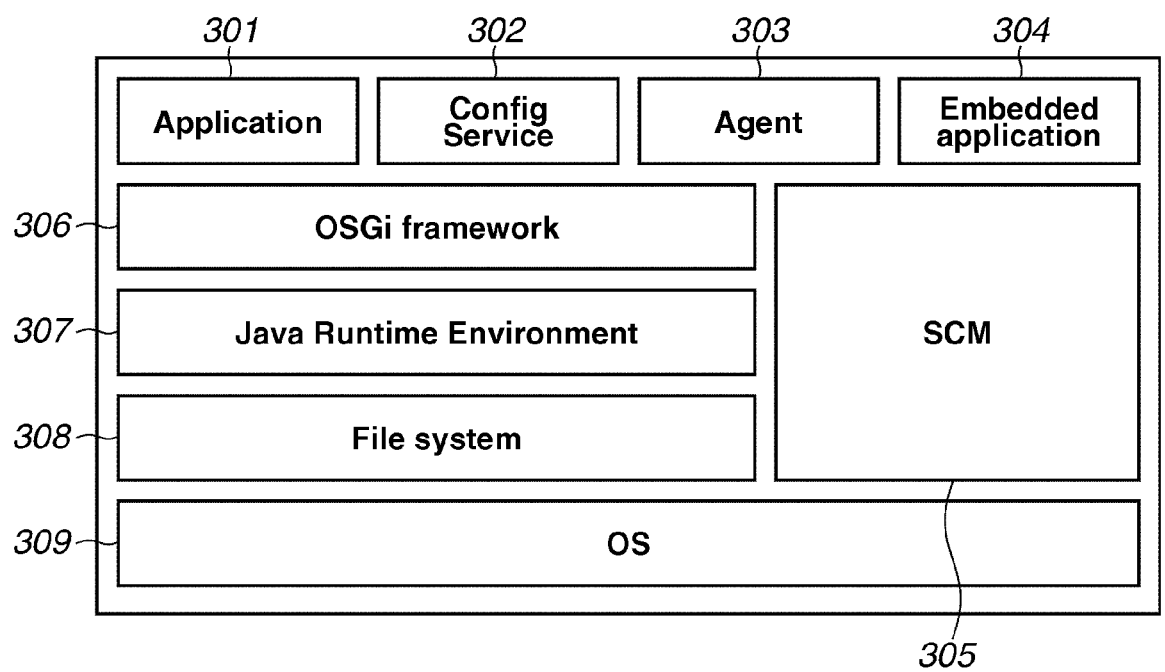
FIG. 3 illustrates a configuration of software modules included in the image forming apparatus.

The HDD 107 stores various software modules illustrated in FIG. 3. Each of the software modules is read from the HDD 107 to the RAM 105 and is then executed by the CPU 103. A software module to be executed can receive a user operation input from the operation unit 108 and can use and control the printer unit 102, the RAM 105, the NI 104, the HDD 107, and the like.

The USB controller 110 can be connected to various external USB devices and can control such devices via a program or a driver read by the CPU 103.

The SRAM 109 is a non-volatile memory capable of permanently storing a relatively small amount of data by using power supplied from a battery (not illustrated). A software module read from the HDD 107 to the CPU 103 can read/write data in the SRAM 109.

The image forming apparatus can communicate with the server apparatus 201 via the NI 104.

FIG. 3 illustrates a configuration of software modules included in the image forming apparatus 202/203.

An operating system (OS) 309 is executed on the CPU 103 of the image forming apparatus. On the OS 309, a file system 308 and a system configuration manager (SCM) 305 provide functions of reading and writing files on the HDD 107 and data on the SRAM 109, respectively. The HDD 107 or the SRAM 109 stores setting data of the image forming apparatus (setting data of the image forming apparatus main body and setting data of an application 301, which will be described below).

In addition, a Java (registered trademark) Runtime Environment 307 and an embedded application 304 are executed on the OS 309.

In the Java Runtime Environment 307, an Open Services Gateway initiative (OSGi) framework 306, which is an application management framework, operates. On the OSGi framework 306, various types of services are provided such as a Config Service 302. While the Config Service 302 is illustrated in FIG. 3, other services may be included.

The Config Service 302 provides a service of managing setting data of the application 301 that operates on the OSGi framework 306. More specifically, in this service, the application 301 can add, update, and delete setting data via the Config Service 302. The setting data managed by the Config Service 302 is stored in a file format on the file system 308.

The application 301 can be installed via the OSGi framework 306 after the system is activated and requires unique setting data for an operation. As described above, this setting data (setting data of the application 301) is managed by the Config Service 302. At least one application can be installed and included in the image forming apparatus 202/203.

The embedded application 304 is embedded in advance in the image forming apparatus and is executed directly on the OS 309.

Setting data of the entire system of the image forming apparatus (setting data of the image forming apparatus main body) is managed by the SCM 305 in the SRAM 109, and some of the settings belong to the embedded application 304. Thus, the embedded application 304 can add, change, and delete the setting data of the image forming apparatus via the SCM 305.

As in the case of the application 301, an agent 303 can be installed after the system is activated and can operate on the OSGi framework 306.

The agent 303 is a module that plays a central role in a process for extracting setting data (setting data of the image forming apparatus main body and setting data of the application 301) from the image forming apparatus and transmitting the setting data to the server apparatus 201 and a process for applying setting data distributed from the server apparatus 201 to an image forming apparatus (these processes will be described in detail below).

Figure 4:
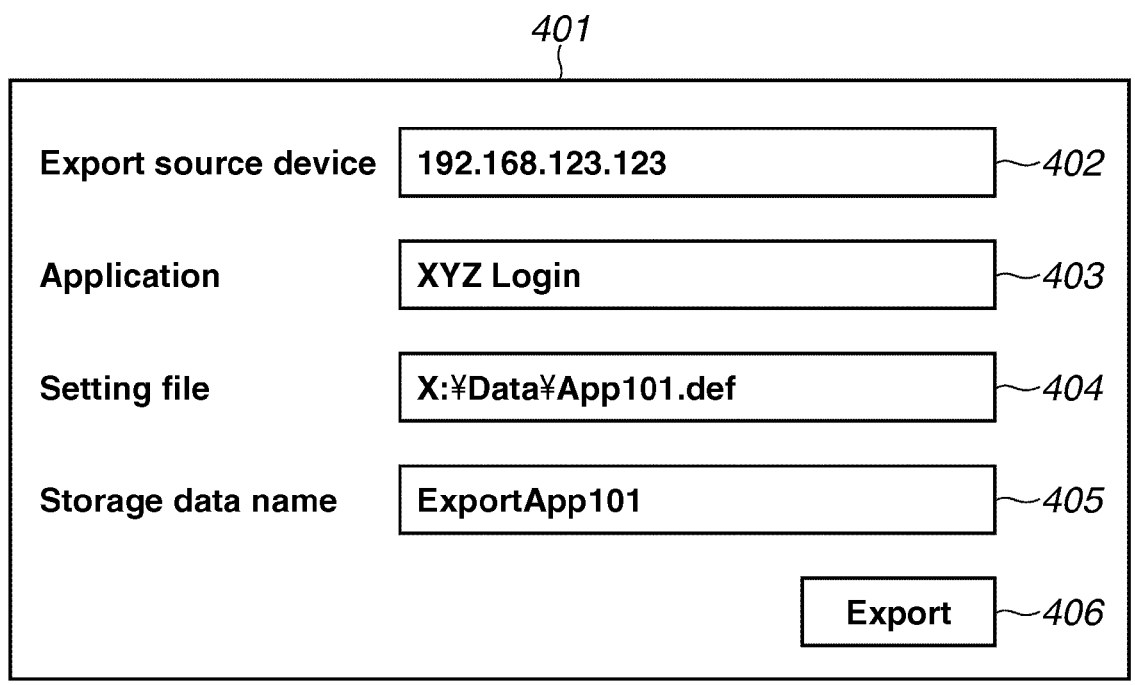
FIG. 4 illustrates an operation screen displayed when a server apparatus executes a setting data extraction (export) operation.

FIG. 4 illustrates an operation screen 401 displayed when the server apparatus 201 executes a setting data extraction (export) operation.

The operation screen 401 in FIG. 4 is used for extracting (exporting) setting data. This operation screen 401 is stored in the HDD of the server apparatus 201. When a client apparatus (not illustrated) accesses the server apparatus 201, the operation screen 401 is transmitted from the server apparatus 201 and is displayed on a display of the client apparatus. Screen data of this operation screen 401 may be stored in a storage device of the client apparatus so that the operation screen 401 can be displayed on a display of the client apparatus. Further alternatively, the server apparatus 201 may read screen data of the operation screen 401 from the HDD and display the operation screen 401 on a display of the server apparatus 201. The client apparatus may be the image forming apparatus 202 or 203. The operation screen 401 will hereinafter be described in detail.

In the operation screen 401, an export source device entry field 402 is for specifying the IP address of an export source device. In FIG. 4, the entry field 402 specifies the image forming apparatus 202.

An application name entry field 403 is for specifying an application to which setting data to be extracted belongs. In FIG. 4, the entry field 403 specifies the application 301.

A setting file entry field 404 is for specifying a setting file specifying setting data to be extracted. The setting file will be described in detail with reference to FIG. 5.

A storage data name entry field 405 is for specifying a file path that can be accessed from the server apparatus 201. The setting data to be extracted is stored in the specified file path of the server apparatus 201.

When an export button 406 is pressed, an export instruction (including the setting file) is transmitted to the server apparatus 201 from the client apparatus displaying the operation screen 401. Upon receiving the instruction, the server apparatus 201 executes a process illustrated in FIG. 10 to transmit a setting data extraction request to the image forming apparatus specified in the export source device entry field 402 (the image forming apparatus 202 in FIG. 4). As a result, the image forming apparatus specified in the export source device entry field 402 executes an export process illustrated in FIG. 12, to transmit setting data exported therefrom to the HDD of the server apparatus 201. The HDD of the server apparatus 201 associates the setting data exported from the image forming apparatus with information about the image forming apparatus and stores and manages the associated data.

FIG. 5 illustrates a setting file 501 of the application 301.

In FIG. 5, the setting file 501 of the application 301 is the setting file specified in the entry field 404 in FIG. 4. Based on settings of this setting file 501, setting values of the application of the image forming apparatus or setting values of the image forming apparatus main body are extracted, and the extracted setting values are transmitted to the server apparatus 201 as setting data (for example, as setting data 1301 in FIG. 13). The setting data will be transferred to and set in the extraction-source image forming apparatus or another image forming apparatus.

A line 502 specifies "@ApplicationIds:" in which the application ID of the application 301 to which the setting file 501 is directed is set. A line 503 specifies "@ApplicationName:" in which the application name of the application 301 to which the setting file 501 is directed is set. A line 504 specifies "@ApplicationVersion:" in which the version name of the application 301 to which the setting file 501 is directed is specified.

A line 505 indicating "@RequireSystemSetting:" specifies whether to change settings of the image forming apparatus simultaneously when setting items of the application 301 described in the setting file 501 are set. If the value in this line 505 in the setting file 501 represents "true," the agent 303 determines that settings of the image forming apparatus need to be changed. If the value represents "false," the agent 303 determines that settings of the image forming apparatus do not need to be changed.

A line head declaring "export:" or "export_enc:" such as in lines 506 to 508 and lines 514 to 518 specifies extracting a setting item determined by the access key described to the right of ":" from the extraction-source image forming apparatus and setting the setting item in a distribution-destination image forming apparatus. As in the line 515, a line head declaring "export_enc:" specifies extracting a setting value set in the image forming apparatus and encoding the setting value.

In addition, as in lines 510 to 513, a line head declaring "set:" specifies referring to a setting item determined by the access key described to the right of ":" and setting the value specified in the same line (value to the right of "=") in the distribution-destination image forming apparatus, instead of extracting a setting from the image forming apparatus. More specifically, information in a line whose line head declares "set:" is information including a setting value that is set in the image forming apparatus main body relating to the application.

An access key starting with "cm/" specifies a setting item of the application 301 stored in the Config Service 302. More specifically, information in a line including an access key starting with "cm/" is information specifying a setting item for extracting a setting value of an application installed on the image forming apparatus.

In addition, an access key starting with "sys/" specifies a setting item of the image forming apparatus. More specifically, information in a line including an access key starting with "sys/" is information specifying a setting item for extracting a setting value of the image forming apparatus main body relating to the application.

Next, each of the lines will be described in detail.

The line 506 declares "export:" and specifies that a setting item determined by an access key "cm/pid/authServer" (setting of the authentication server of the application 301) is extracted from the extraction-source image forming apparatus and that the extracted setting item is set in the distribution-destination image forming apparatus.

The line 507 declares "export:" and specifies that a setting item determined by an access key "cm/pid/logLevel" (setting of the log level of the application 301) is extracted from the extraction-source image forming apparatus and that the extracted setting item is set in the distribution-destination image forming apparatus.

The line 508 declares "export:" and specifies that a setting item determined by an access key "cm/pid/securityLevel" (setting of the security level of the application 301) is extracted from the extraction-source image forming apparatus and that the extracted setting item is set in the distribution-destination image forming apparatus.

Settings of the lines 506 to 508 vary depending on operations of the application 301. Thus, detailed descriptions about application-specific operations will be omitted herein.

A line 509 declares "export:" and specifies that a setting item determined by an access key "sys/auth/ils" (setting for allocating a user database (DB) account in the image forming apparatus) is extracted from the extraction-source image forming apparatus and that the extracted setting item is set in the distribution-destination image forming apparatus. The setting for allocating a user DB account in the image forming apparatus is for enabling the application 301 to operate with a single user authority in the image forming apparatus and to execute various operations in the image forming apparatus.

The line 510 declares "set:" and specifies that value "1" to the right of "=" is set in the distribution-destination image forming apparatus as a setting value of a setting item determined by an access key "sys/nw/tcpip/https" (setting for whether to change HTTP communication by the image forming apparatus to secure HTTPS communication). More specifically, the setting item specified by this access key is not extracted from the image forming apparatus. If the setting value represents "1," HTTPS communication is set. If the setting value represents "0," HTTPS communication is not set.

The line 511 declares "set:" and specifies that value "0" to the right of "=" is set in the distribution-destination image forming apparatus as a setting value of a setting item determined by an access key "sys/ext/usb/systemdrv/hid" (setting for whether to change validity (valid/invalid) of the driver of a USB-connection human interface device (HID) such as a keyboard).

The line 512 declares "set:" and specifies that value "1" to the right of "=" is set in the distribution-destination image forming apparatus as a setting value of a setting item determined by an access key "sys/dev/print/outtray" (setting of the sheet discharge tray to which a print job is output).

The line 513 declares "set:" and specifies that value "2" to the right of "=" is set in the distribution-destination image forming apparatus as a setting value of a setting item determined by an access key "sys/dev/copy/outtray" (setting of the sheet discharge tray to which a copy job is output).

In FIG. 5, the line 512 specifies that sheets by the print jobs in the image forming apparatus are always discharged to tray 1, and the line 513 specifies that sheets by the copy jobs in the image forming apparatus are always discharged to tray 2. More specifically, the application 301 operates on the assumption that, depending on the job type, sheets are set to be discharged to a predetermined tray on the image forming apparatus.

The line 514 declares "export:" and specifies that a setting item determined by an access key "sys/auth/admin/id" (system administrator ID set in the image forming apparatus) is extracted from the image forming apparatus and that the extracted setting item is set in the distribution-destination image forming apparatus.

The line 515 declares "export_enc:" and specifies that a setting item determined by an access key "sys/auth/admin/passwd" (system administorator password set by the image forming apparatus) is extracted from the extraction-source image forming apparatus and that the extracted setting item is set in the distribution-destination image forming apparatus. The line head "export_enc:" specifies that the extracted data needs to be encoded.

The line 516 declares "export:" and specifies that a setting item determined by an access key "sys/nw/tcpio/dns/server" (setting value of the DNS server to which the image forming apparatus belongs) is extracted from the extraction-source image forming apparatus and that the extracted setting item is set in the distribution-destination image forming apparatus.

The line 517 declares "export:" and specifies that a setting item determined by an access key "sys/nw/tcpio/dns/server" (setting value of the DNS domain name to which the image forming apparatus belongs) is extracted from the extraction-source image forming apparatus and that the extracted setting item is set in the distribution-destination image forming apparatus.

The line 518 declares "export:" and specifies that a setting item determined by an access key "sys/nw/tcpio/proxy/http" (setting value of the HTTP proxy server of the image forming apparatus) is extracted from the extraction-source image forming apparatus and that the extracted setting item is set in the distribution-destination image forming apparatus.

As described above, the setting file 501 of the application 301 includes the first items (502 to 504, for example) for specifying an application and the second items (506 to 518) for specifying operation target setting contents. The second setting item can include information for extracting setting values of the application installed on the image forming apparatus, information for extracting setting values of the image forming apparatus main body relating to the application, and setting values set in the image forming apparatus main body in relation to the application.

The setting file 501 in FIG. 5 is generated and provided by a provider of the application 301, for example. However, the setting file 501 may be generated in an arbitrary method and be provided by an arbitrary provider.

FIGS. 6 and 7 illustrate setting files for image forming apparatuses. More specifically, FIG. 6 illustrates a setting file of the image forming apparatus 202 and FIG. 7 illustrates a setting file of the image forming apparatus 203.

FIG. 6 illustrates a setting file 601 of the image forming apparatus 202. This setting file 601 of the image forming apparatus 202 indicates a correspondence relationship between an access key in a setting item and a real address specifying where the setting item is stored in the image forming apparatus 202.

While map information about setting values of the image forming apparatus main body may vary depending on the model, by using a setting file of each image forming apparatus, the difference in map information about setting values between models (correspondence relationship between a setting item and a real address in which a setting value of the setting item is stored) can be absorbed.

Thus, there is no need to prepare and install a program for each image forming apparatus model. More specifically, by using a single program, setting values can be exported/imported from/to an image forming apparatus main body. In addition, setting values can be migrated between different models. More specifically, when a setting value is extracted from a first image forming apparatus and the setting value is migrated to a second image forming apparatus, a setting file of the image forming apparatuses can be used. In this way, the setting value can be migrated easily.

Next, the setting file 601 will be described in detail.

A line 602 specifies that a value "00000000-0000-0000-0000-000000000000" is set as an application ID. This ID value is a specially defined value specifying that the setting file 601 is directed to a group of setting values set in the image forming apparatus main body, not a specific application corresponding to the image forming apparatus. More specifically, in the present exemplary embodiment, it is preliminarily defined that the value "00000000-0000-0000-0000-000000000000" specifies a group of setting values of the image forming apparatus main body.

A line 603 is a format item defining an application in the image forming apparatus. Since this item is not particularly used in the following description, no setting value is specified.

A line 604 specifies a model-specific ID allocated to each image forming apparatus model. It is assumed that each image forming apparatus has a model-specific ID for identifying the model thereof. Generally, an image forming apparatus is provided with a model-specific ID.

A line 605 specifies a display name indicating the model name of the image forming apparatus 202. The display name is not particularly used in the following description. A line 606 specifies a formal name of the model of the image forming apparatus 202. The formal name is not particularly used in the following description.

The line heads of lines 607 to 616 declare either "export:" or "export_enc:" for specifying various setting items of the image forming apparatus 202 and physical addresses of the setting values and extracting the setting values.

In FIG. 6, on the right side of "export:" or "export_enc:" in each line, there is a character string divided by ", (comma)" into two parts. On the right side, the part to the left of ", (comma)" specifies an access key identifying a setting item and the part to the right of ", (comma)" specifies a real address specifying where the value of the setting item is stored in the image forming apparatus. More specifically, information in a line starting with "export:" or "export_enc:" is information specifying a setting value storage location in the image forming apparatus main body.

The correspondence between an access key and a real address in a line starting with "export:" or "export_enc:" is used not only when a setting value is extracted from the extraction-source image forming apparatus but also when a setting value is set in the distribution-destination image forming apparatus based on the extracted setting data.

Next, the lines 607 to 616 will be described in detail.

The line 607 is a setting for allocating a user DB account in the image forming apparatus so that an application in the image forming apparatus operates. In FIG. 6, the real address of this setting item does not specify an account allocated to a specific application. This is a setting for extracting all the account information about the applications in the image forming apparatus to which accounts have been allocated.

The lines 608 and 609 specify a correspondence between an access key and a real address for extracting (setting) a setting of a sheet discharge tray on the image forming apparatus 202 to which a print job and a copy job are output, respectively.

The line 610 specifies a correspondence between an access key and a real address for extracting (setting) a setting for changing validity (valid/invalid) of a driver of a USB-connection HID such as a keyboard.

The lines 611 and 612 specify a correspondence between an access key and a real address for extracting (setting) a system administrator ID and password of the image forming apparatus 202, respectively.

The line 613 specifies a correspondence between an access key and a real address for extracting (setting) a setting for HTTP communication of the image forming apparatus 202. The line 614 specifies a correspondence between an access key and a real address for extracting (setting) a setting value of the DNS server set in the image forming apparatus 202.

The line 615 specifies a correspondence between an access key and a real address for extracting (setting) a setting value of the DNS domain name set in the image forming apparatus 202. The line 616 specifies a correspondence between an access key and a real address for extracting (setting) a setting value of the HTTP proxy server set in the image forming apparatus 202.

While the setting file 601 illustrated in FIG. 6 includes setting items other than the above setting items, to simplify the figure and since such setting items are not used in the following description, illustration of the setting items is omitted.

FIG. 7 illustrates a setting file 701 of the image forming apparatus 203.

FIG. 7 is different from FIG. 6 in that lines 704 to 706 specify values of the image forming apparatus 203. In addition, in lines 708 to 716, unlike those in FIG. 6, real addresses that are in items defined by corresponding access keys are those in the image forming apparatus 203. Since each line is similar to that in FIG. 6, redundant description thereof will be avoided herein.

The setting files 601 and 701 in FIGS. 6 and 7 can be generated and provided by manufacturers of the image forming apparatuses 202 and 203, for example. However, the setting files 601 and 701 may be generated by arbitrary methods and provided by arbitrary manufacturers.

As described above, as in the setting file 501 of the application illustrated in FIG. 5, each of the setting files 601 and 701 of the image forming apparatuses illustrated in FIGS. 6 and 7 includes first items for specifying an application and second items for specifying operation target setting contents. However, in the first items, a predetermined value defined for an operation of a setting value of the image forming apparatus, not a setting value for specifying an application, is set. In addition, in the second items, information specifying setting value storage locations in the image forming apparatus main body is set.

Figure 8:
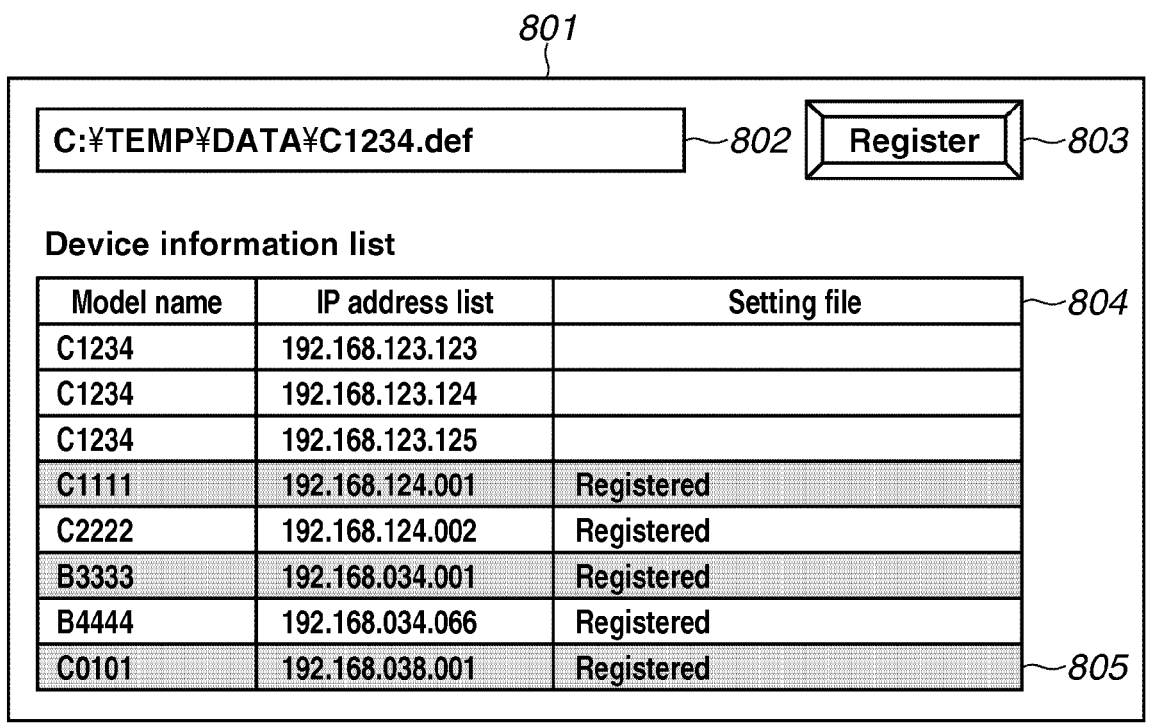
FIG. 8 illustrates an operation screen displayed when the server apparatus executes an operation for associating a setting file of an image forming apparatus.

FIG. 8 illustrates an operation screen 801 displayed when the server apparatus 201 executes an operation for associating a setting file of an image forming apparatus. This operation screen 801 is stored in the HDD of the server apparatus 201. When a client apparatus (not illustrated) accesses the server apparatus 201, the operation screen 801 is transmitted from the server apparatus 201 and is displayed on a display of the client apparatus. Screen data of this operation screen 801 may be stored in a storage device of the client apparatus so that the operation screen 801 can be displayed on a display of the client apparatus. Further alternatively, the server apparatus 201 may read screen data of the operation screen 801 from the HDD and display the operation screen 801 on a display of the server apparatus 201. The client apparatus may be the image forming apparatus 202 or 203. The operation screen 801 will hereinafter be described in detail.

On the operation screen 801, an entry field 802 is for entering the file name of a setting file of an image forming apparatus to be registered in the server apparatus 201. In FIG. 8, the setting file 601 of the image forming apparatus 202 illustrated in FIG. 6 is entered in the entry field 802 for registration.

A device information list 804 lists the image forming apparatuses managed by the server apparatus 201 and the registration statuses of the setting files corresponding to the image forming apparatuses. For example, various types of information about the image forming apparatuses are registered in the HDD of the server apparatus 201, including the model names, the model-specific IDs, and the IP addresses of the image forming apparatuses managed by the server apparatus 201. In addition, when a setting file is registered via the operation screen 801, the information about the registered setting file is associated with the information about the image forming apparatus. Thus, from these items of information, the device information list 804 is generated in the HDD of the server apparatus 201.

The device information list 804 lists the model names and the IP addresses of the image forming apparatuses and shows whether a setting file has been registered for each image forming apparatus. For example, a line 805 in the device information list 804 specifies an image forming apparatus to which setting data is distributed, which will be described below with reference to FIG. 14. A setting file has already been registered for this image forming apparatus.

If a registration button 803 is pressed, a registration instruction is transmitted to the server apparatus 201 from a client apparatus displaying the operation screen 801. When receiving the instruction, the CPU of the server apparatus 201 associates the setting file registered in the entry field 802 with the model-specific ID (line 604 in FIG. 6) described in the setting file and registers the data in the storage device (HDD) of the server apparatus 201. In addition, the CPU of the server apparatus 201 sets the "setting file" column in the device information list 804 of the image forming apparatus to which the registered setting file is directed to "Registered."

Figure 9:
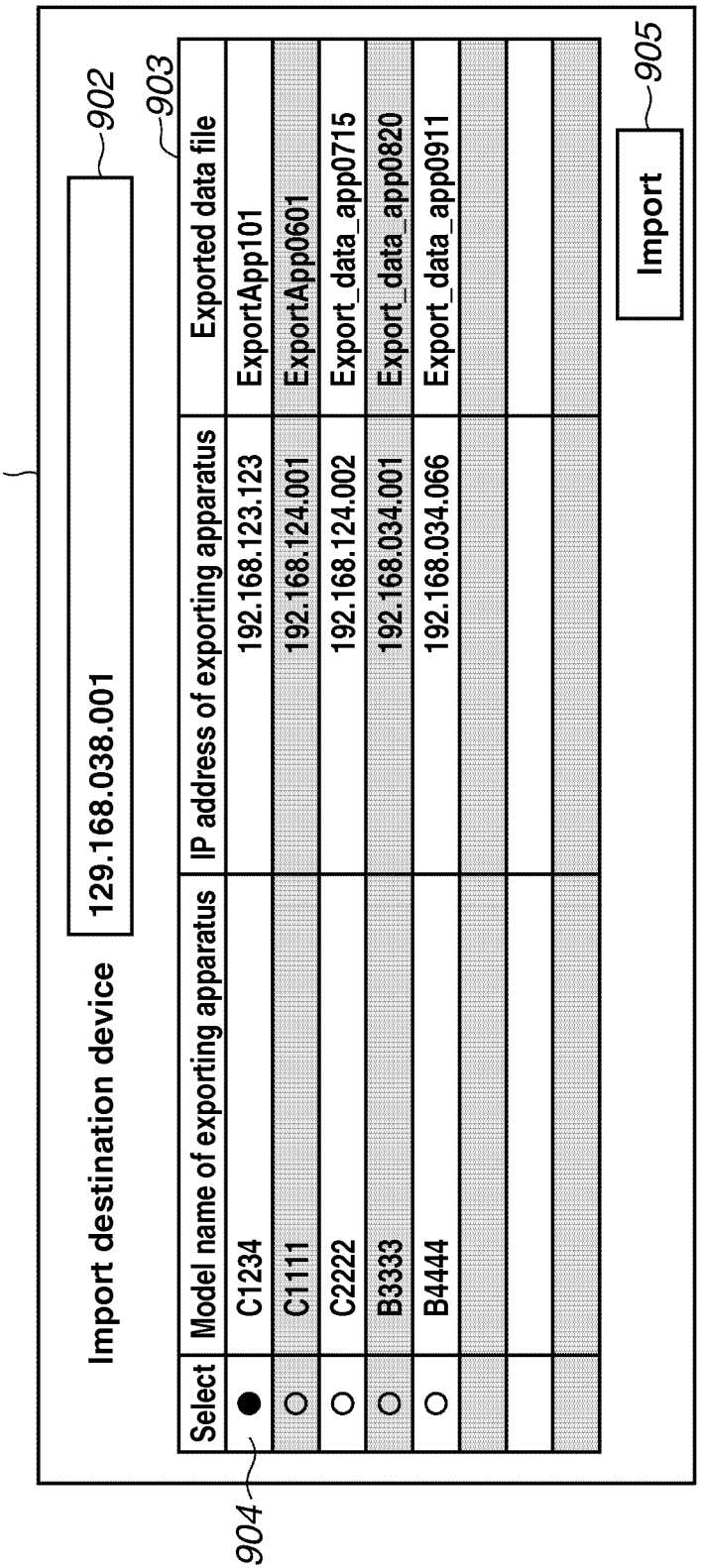
FIG. 9 illustrates an operation screen displayed when the server apparatus executes a setting data distribution (import) operation.

FIG. 9 illustrates an operation screen 901 displayed when the server apparatus 201 executes a setting data distribution (import) operation.

The operation screen 901 in FIG. 9 is displayed to distribute (import) setting data. The operation screen 901 is an operation screen of the server apparatus 201 for distributing setting data, which is extracted (exported) from an image forming apparatus by operating the operation screen 401 in FIG. 4, to the extraction-source image forming apparatus or another image forming apparatus.

The operation screen 901 is stored in the HDD of the server apparatus 201. When a client apparatus (not illustrated) accesses the server apparatus 201, the operation screen 901 is transmitted from the server apparatus 201 and is displayed on a display of the client apparatus. Screen data of this operation screen 901 may be stored in a storage device of the client apparatus so that the operation screen 901 can be displayed on a display of the client apparatus. Further alternatively, the server apparatus 201 may read screen data of the operation screen 901 from the HDD and display the operation screen 901 on a display of the server apparatus 201. The client apparatus may be the image forming apparatus 202 or 203. The operation screen 901 will hereinafter be described in detail.

On the operation screen 901, an entry field 902 is for specifying the IP address of the distribution destination image forming apparatus. In FIG. 9, the image forming apparatus 203 is specified as the distribution destination.

A table 903 is a list of extracted setting data stored in the server apparatus 201. In the HDD of the server apparatus 201, data files including setting data exported from image forming apparatuses are associated with information about the respective extraction (export) source image forming apparatuses. From these items of information, the table 903 is generated. In the table 903, a user selects setting data, which is extracted from an image forming apparatus as a result of an export instruction via the operation screen 401 in FIG. 4, as setting data to be distributed to the image forming apparatus specified in the entry field 902.

Since the table 903 lists the IP addresses of the image forming apparatuses from which setting data has been exported and the names of the data files including the setting data, a user can see a list of setting data exported from the image forming apparatuses. In the table 903 in FIG. 9, a line 904 specifying the setting data extracted from image forming apparatus 202 is selected.

A button 905 is for executing distribution of the setting data. If the button 905 is pressed, a distribution instruction is transmitted to the server apparatus 201 from the client apparatus displaying the operation screen 901. When receiving the instruction, the CPU of the server apparatus 201 distributes the setting data selected in the table 903 (setting data extracted by the operation in FIG. 4) to the image forming apparatus specified in the entry field 902 (to the image forming apparatus 203 in FIG. 9).

Next, a process (extraction request process) will be described with reference to FIG. 10. In this process, the server apparatus 201 transmits a request for extracting setting data to the agent 303 of the image forming apparatus 202.

Figure 10:
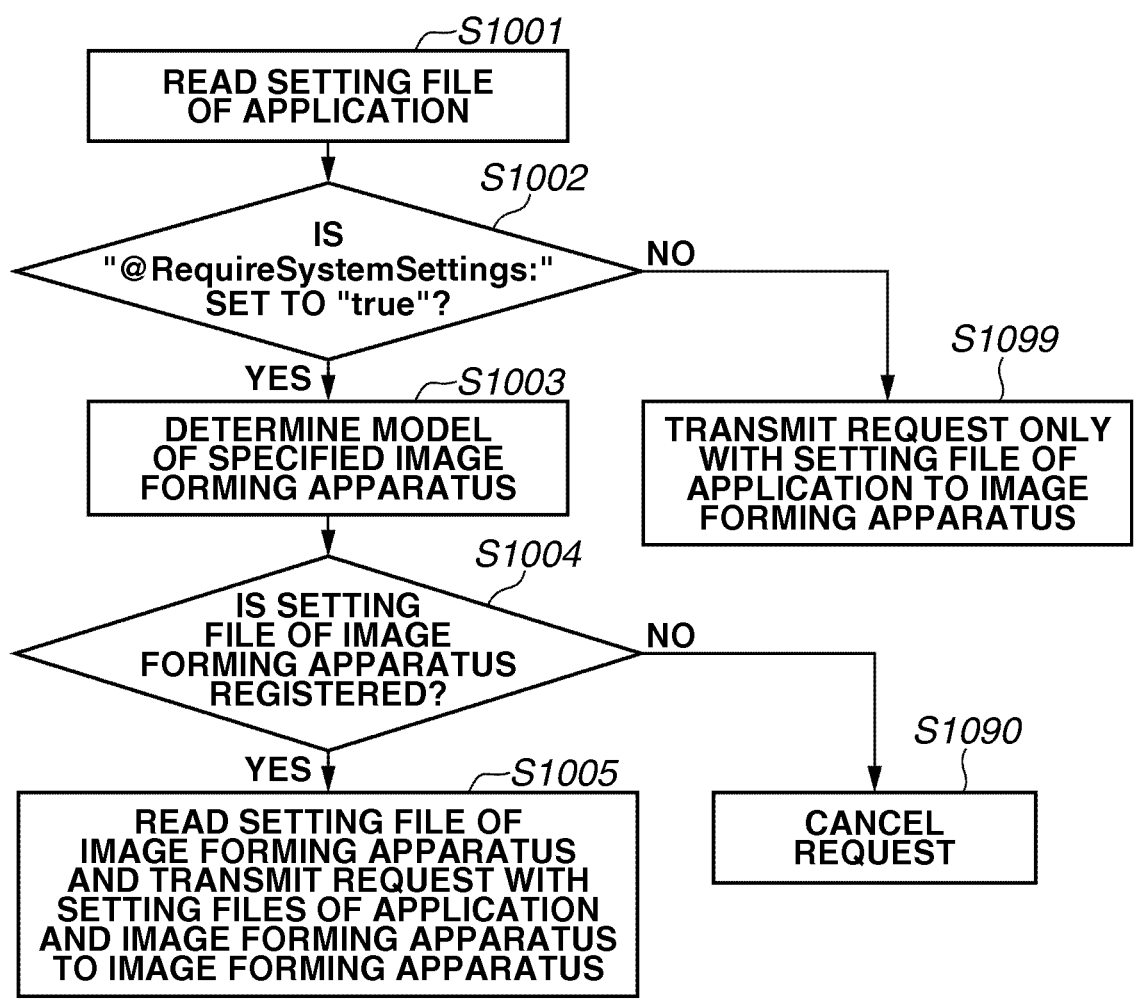
FIG. 10 is a flow chart illustrating an extraction request transmission process executed by the server apparatus when an export button in FIG. 4 is pressed.

FIG. 10 is a flow chart illustrating the process (extraction request process). When the export button 406 in FIG. 4 is pressed, the server apparatus 201 transmits an extraction request. The process of the flow chart is realized by causing the CPU of the server apparatus 201 to read and execute a computer-readable program stored in the HDD of the server apparatus 201.

When the CPU of the server apparatus 201 receives an export instruction from a client, the CPU starts the process of the flow chart. First, in step S1001, the CPU of the server apparatus 201 reads the setting file 501 of the application 301 specified in the entry field 404 in FIG. 4. If the application name specified by "@ApplicationName:" in the read setting file 501 is different from the application name specified in the entry field 403 in FIG. 4, an error message may be displayed and the process of the flow chart may be terminated.

Next, in step S1002, the CPU of the server apparatus 201 determines whether the line "@RequireSystemSettings:" is registered and "true" is set in the setting file 501.

In step S1002, if the CPU of the server apparatus 201 determines that "@RequireSystemSettings:" is not set to "true" (NO in step S1002), the CPU of the server apparatus 201 causes the operation to proceed to step S1099.

In step S1099, along with the request, the CPU of the server apparatus 201 transmits only the setting file 501 of the application 301 to the agent 303 of the image forming apparatus (for example, the image forming apparatus 202) corresponding to the IP address specified in the entry field 402 in FIG. 4. The CPU of the server apparatus 201 then terminates the process of the flow chart.

On the other hand, in step S1002, if the CPU of the server apparatus 201 determines that "@RequireSystemSettings:" is set to "true" (YES in step S1002), the CPU of the server apparatus 201 causes the operation to proceed to step S1003.

In step S1003, the CPU of the server apparatus 201 determines the model (model name, model-specific ID, etc.) of the image forming apparatus corresponding to the IP address specified in the entry field 402 in FIG. 4, based on the information about the model of the image forming apparatus registered in the HDD of the server apparatus 201. In the present exemplary embodiment, the model information about the image forming apparatus is registered in advance in a database established in the HDD of the server apparatus 201. The information can be registered in the database by searching or by a manual operation of a user, for example.

Next, in step S1004, the CPU of the server apparatus 201 determines whether the setting file (setting file 601 in this case) of the image forming apparatus corresponding to the model determined in step S1003 is registered in the server apparatus 201.

In step S1004, if the CPU of the server apparatus 201 determines that the setting file of the image forming apparatus corresponding to the determined model is not registered in the server apparatus 201 (NO in step S1004), the CPU of the server apparatus 201 causes the operation to proceed to step S1090.

In step S1090, the CPU of the server apparatus 201 displays an error message as illustrated in FIG. 11 on the display device displaying the operation screen 401 in FIG. 4, cancels the request, and terminates the process of the flow chart.

FIG. 11 illustrates an error message displayed on the display device displaying the operation screen 401 in FIG. 4.

In step S1004, if the CPU of the server apparatus 201 determines that the setting file of the image forming apparatus corresponding to the determined model is registered in the server apparatus 201 (YES in step S1004), the CPU of the server apparatus 201 causes the operation to proceed to step S1005.

In step S1005, the CPU of the server apparatus 201 reads the setting file 601 of the image forming apparatus corresponding to the determined model and transmits the read setting file 601 and the extraction request, to which the setting file (for example, the setting file 501 in FIG. 5) of the application 301 specified in the entry field 405 in FIG. 4 is attached, to the agent 303 of the image forming apparatus (a first image forming apparatus, for example, the image forming apparatus 202) corresponding to the IP address specified in the entry field 402 in FIG. 4. Next, the CPU of the server apparatus 201 terminates the process of the flow chart.

As described above, the extraction request transmission process (extraction request process) in FIG. 10 corresponds to a setting file transmission process in which the server apparatus 201 transmits at least one setting file (setting file of an application and a setting file of an image forming apparatus) including a first item for specifying an application and a second item for specifying an operation target setting content to an image forming apparatus.

Next, a flow in which the agent 303 of the image forming apparatus processes the extraction request transmitted from the server apparatus 201 in step S1005 or S1099 in FIG. 10 will be described with reference to FIG. 12.

FIG. 12 is a flow chart illustrating a process executed by the agent 303 of the image forming apparatus that has received the extraction request from the server apparatus 201. The process of the flow chart is executed by the agent 303 of the image forming apparatus. More specifically, the process of the flow chart is realized by causing the CPU 103 of the image forming apparatus to read and execute a computer-readable program recorded in the HDD 107.

First, in step S1201, the agent 303 of the image forming apparatus receives an extraction request and causes the operation to proceed to step S1202. As illustrated in FIG. 10, the setting file 501 of the application 301 is attached to the request. Along with the request, the agent 303 of the image forming apparatus receives at least one setting file including a first item for specifying an application and a second item for specifying an operation target setting content (for example, a setting file of an application and a setting file of an image forming apparatus) from the server apparatus 201.

In step S1202, the agent 303 reads the setting file 501 of the application 301 attached to the extraction request and determines whether the line "@RequireSystemSettings:" is registered and "true" is set.

In step S1202, if the agent 303 determines that "@RequireSystemSettings:" is not set to "true" in the setting file 501 of the application 301 (NO in step S1202), the agent 303 causes the operation to proceed to step S1205, without extracting setting data of the image forming apparatus.

In step S1202, if the agent 303 determines that "@RequireSystemSettings:" is set to "true" in the setting file 501 of the application 301 (YES in step S1202), the agent 303 causes the operation to proceed to step S1203.

In step S1203, the agent 303 determines whether the setting file of the image forming apparatus is attached to the extraction request. In this determination, the agent 303 determines whether a setting file in which a specially defined value indicating that the setting operation target is a group of setting values set in the image forming apparatus main body is set as an application ID is attached. Regarding the determination of the setting file, more specifically, as described in FIG. 6, the agent 303 determines whether "00000000-0000-0000-0000-000000000000" is set in the application ID setting item (@ApplicationIds:).

In step S1203, if the agent 303 determines that no setting file of the image forming apparatus is attached to the extraction request (NO in step S1203), the agent 303 causes the operation to proceed to step S1205.

On the other hand, in step S1203, if the agent 303 determines that the setting file of the image forming apparatus is attached to the extraction request (YES in step S1203), the agent 303 causes the operation to proceed to step S1204.

In step S1204, the agent 303 determines whether the setting file attached to the extraction request corresponds to the extraction-source image forming apparatus. More specifically, the agent 303 determines whether the model-specific ID of the image forming apparatus on which the agent 303 is operating matches the value in the line "@ApplicationVersion:" in the setting file of the image forming apparatus attached to the extraction request. This line specifies the model-specific ID of the image forming apparatus to which the setting file of the image forming apparatus is directed and corresponds to the line 604 in FIG. 6 and the line 704 in FIG. 7. The model-specific ID of the image forming apparatus is stored in the HDD 107 thereof, for example. In step S1204, if the model-specific ID in the above line in the setting file matches the model-specific ID stored in the HDD 107 of the extraction-source image forming apparatus, the agent 303 determines that the setting file of the image forming apparatus attached to the extraction request corresponds to the extraction-source image forming apparatus. More specifically, if the extraction-source image forming apparatus is the image forming apparatus 202, the agent 303 determines that setting file is the setting file 601 in FIG. 6.

In step S1204, if the agent 303 determines that the setting file attached to the above extraction request does not correspond to the extraction-source image forming apparatus (if the model-specific IDs do not match) (NO in step S1204), the agent 303 causes the operation to proceed to step S1299.

In step S1299, the agent 303 determines that an unauthorized setting file has been specified, cancels the extraction request, and terminates the process of the flow chart. In step S1299, the agent 303 may notify the server apparatus 201 that an unauthorized setting file has been specified.

In step S1204, if the above attached setting file corresponds to the extraction-source image forming apparatus (the model-specific IDs match) (YES in step S1204), the agent 303 causes the operation to proceed to step S1205.

Next, in steps S1205 to S1212, the agent 303 reads and analyzes each of the lines (lines 506 to 518 in FIG. 5) in the setting file 501 of the application 301, to execute a process for extracting the setting data of the application 301. Next, each of the steps will be described in details.

First, in step S1205, the agent 303 reads one line (hereinafter, the current line) in the setting file 501 of the application 301 and causes the operation to proceed to step S1206.

In step S1206, the agent 303 analyzes a value in the current line to determine whether the current line corresponds to setting data of the application 301. More specifically, if a line includes an access key (to the right of ":") starting with "cm/", the agent 303 determines that the line corresponds to setting data of the application 301. If not, the agent 303 determines that the line does not correspond to setting data of the application 301. In FIG. 5, since all the lines 506 to 508 include an access key starting with "cm/", the agent 303 determines that the lines correspond to setting data of the application 301 stored in the Config Service 302.

Next, in step S1206, if the agent 303 determines that the current line corresponds to setting data of the application 301 (YES in step S1206), the agent 303 causes the operation to proceed to step S1207.

In step S1207, the agent 303 extracts data corresponding to the access key in the current line from the setting data allocated to the application 301 in the Config Service 302. Next, the agent 303 causes the operation to proceed to step S1212.

In step S1206, if the agent 303 determines that the current line does not correspond to setting data of the application 301 (NO in step S1206), the agent 303 causes the operation to proceed to step S1208.

In step S1208, the agent 303 determines whether the line head of the current line specifies "export:".

In step S1208, if the agent 303 determines that the line head of the current line does not specify "export:" (for example, the lines 510 to 513 in FIG. 5) (NO in step S1208), the agent 303 determines that the current line is setting data (the line head of the line specifies "set:" (for example, the lines 510 to 513 in FIG. 5)), not an extraction target. As a result, the agent 303 causes the operation to proceed to step S1211.

In step S1211, the agent 303 acquires an access key specified in the current line and a value (value to the right of "=") specified as setting data of the access key, namely, data to be set in the distribution-destination image forming apparatus. Next, the agent 303 causes the operation to proceed to step S1212. For example, in the case of the line 510 in FIG. 5, the agent 303 acquires the access key "sys/nw/tcpip/https" and the setting value "1."

On the other hand, in step S1208, if the line head of the current line specifies "export:" (YES in step S1208), the agent 303 causes the operation to proceed to step S1209. In step S1209, the agent 303 determines whether the current line corresponds to a setting item of the image forming apparatus main body. More specifically, if the line includes an access key (to the right of ":") starting with "sys/", the agent 303 determines that the line corresponds to a setting item of the image forming apparatus main body. If not, the agent 303 determines that the line does not correspond to a setting item of the image forming apparatus main body.

In step S1209, if the agent 303 determines that the current line corresponds to a setting item of the image forming apparatus main body (YES in step 1209), the agent 303 causes the operation to proceed to step S1210.

In step S1210, the agent 303 searches the setting file of the image forming apparatus determined in step S1204 for the access key in the current line (namely, an access key of the image forming apparatus). If a corresponding line is found, the agent 303 acquires a real address corresponding to the data, extracts data from the SRAM 109 via the SCM 305, and causes the operation to proceed to step S1212. If a corresponding line is not found in the setting file of the image forming apparatus or if the setting file of the image forming apparatus is not attached, the agent 303 determines that extraction of data corresponding to the access key is invalid. As a result, the agent 303 causes the operation to skip step S1210 and proceed to S1212.

In step S1209, if the agent 303 determines that the current line does not correspond to a setting item of the image forming apparatus main body (NO in step S1209), the agent 303 causes the operation to proceed to step S1212.

In step S1212, the agent 303 processes the next line in the setting file 501 of the application 301 and causes the operation to return to step S1205.

In step S1212, if the agent 303 completes processing the lines in the setting file 501 of the application 301 (the lines 506 to 518 in FIG. 5) and there is no line left to be processed, the agent 303 causes the operation to proceed to step S1213.

In step S1213, the agent 303 encodes the setting file 501 of the application 301 attached to the above extraction request and causes the operation to proceed to step S1214.

In step S1214, the agent 303 generates a setting value data 1301 (FIG. 13, which is composed of FIGS. 13A and 13B) including the data of the application extracted in step S1207, the data of the image forming apparatus extracted in step S1210, the data set in the distribution-destination image forming apparatus acquired in step 1211, and the encoded data of the setting file 501 encoded in step 1213. In addition, in step S1214, the agent 303 transmits the setting value data 1301 to the server apparatus 201. Next, the agent 303 terminates the process of the flow chart.

The setting data 1301 transmitted to the server apparatus 201 in step S1214 in FIG. 12 is associated with the exported model (the model name or the model-specific ID) and the IP address of the exported model and is stored in the HDD of the server apparatus 201 as an exported data file.

FIG. 13, which is composed of FIGS. 13A and 13B, illustrates an excerpt of the setting data 1301 transmitted to the server apparatus 201 in step S1214 in FIG. 12.

As illustrated in FIG. 13, the setting data 1301 is divided by <exportdata> tags and a <settingdata> tag and can include three types of data. The first type of data is a setting data part of the image forming apparatus main body. In FIG. 13, the setting data part of the image forming apparatus main body corresponds to a group of setting values described in a part 1302 in the setting data 1301. As illustrated in the part 1302, the setting data part of the image forming apparatus main body is a group of setting values surrounded by a <exportdata> tag. In an <id> tag, the ID "00000000-0000-0000-0000-000000000000" specifying the image forming apparatus main body is described. In a <version> tag, the model-specific ID of the image forming apparatus is described. In addition, the setting data part of the image forming apparatus main body corresponds to the setting data extracted in step S1210 in FIG. 12 and the setting data acquired in step S1211 in FIG. 12.

The second type of data is a setting data part of the application. In FIG. 13, the setting data part of the application corresponds to a group of setting values described in a part 1303 in the setting data 1301. As illustrated in 1303, the setting data part of the application is a group of setting values surround by an <exportdata> tag. In an <id> tag, an application ID is described, and in a <version> tag, an application version is described. The setting data part of the application corresponds to the data extracted in step S1207 in FIG. 12.

The third type of data is a setting file part of the application. In FIG. 13, the setting file part of the application corresponds to a group of setting values described in a part 1304 in the setting data 1301. As illustrated in the part 1304, the setting file part of the application is a group of setting values surrounded by a <settingdata> tag. The setting file part of the application corresponds to the setting file 501 of the application encoded in step S1213 in FIG. 12. In the present exemplary embodiment, the setting file 501 is converted into a character string by BASE64 encoding, which is a common file encoding method. However, an arbitrary encoding method may be used.

The setting data 1301 may not include the setting data part of the image forming apparatus main body.

Next, a process for distributing the setting data 1301 from the server apparatus 201 to the agent 303 of an image forming apparatus will be described with reference to FIG. 14.

Figure 14:
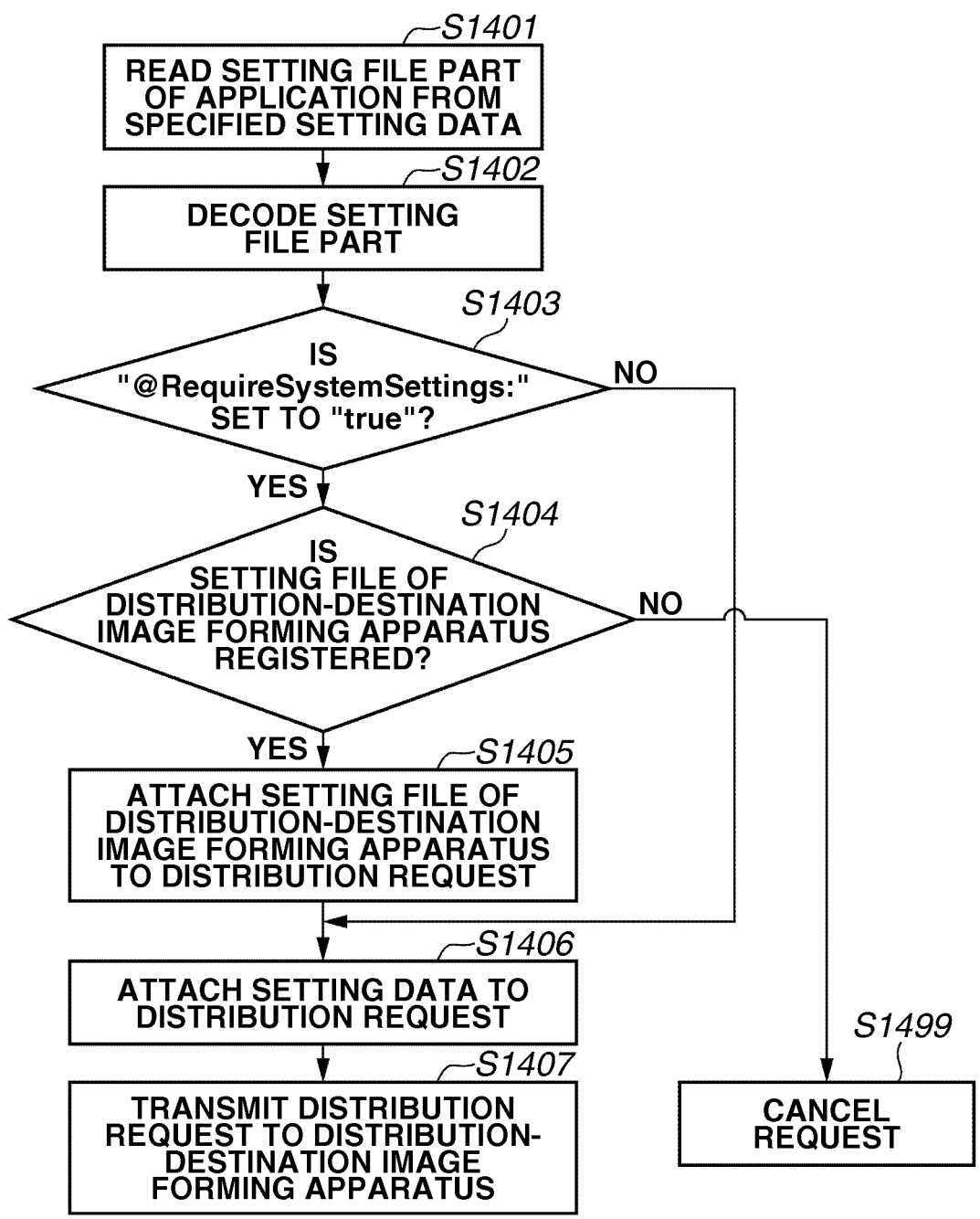
FIG. 14 is a flow chart illustrating a setting data distribution process executed by the server apparatus when an import button in FIG. 9 is pressed.

FIG. 14 is a flow chart illustrating a process for distributing the setting data 1301 executed by the server apparatus 201 when an import button 905 in FIG. 9 is pressed. The process of the flow chart is realized by causing the CPU of the server apparatus 201 to read and execute a computer-readable program stored in the HDD of the server apparatus 201.

The following description will be made assuming that the setting data 1301 has already been selected as the data to be distributed as illustrated by the line 904 in the table 903 in FIG. 9, that a distribution-destination image forming apparatus has already been specified in the import-destination-device entry field 902, and that the import button 905 has already been pressed.

When receiving the import instruction from the client, the CPU of the server apparatus 201 starts the process of the flow chart. First, in step S1401, the CPU of the server apparatus 201 reads the setting file part of the application (the part 1304 in FIG. 13) surrounded by the <settingdata> tag from the setting data 1301 selected as the data file to be exported in the table 903.

In step S1402, since the setting file part is encoded by BASE64 as described with reference to FIG. 13, the CPU of the server apparatus 201 decodes the setting file part read in step S1401.

Next, in step S1403, the CPU of the server apparatus 201 analyzes the setting file part decoded in step S1402 and determines whether the line "@RequireSystemSettings:" is registered and whether "true" is set.

In step S1403, if the CPU determines that the line "@RequireSystemSettings:" is set to "true" in the setting file part decoded in step S1402 (YES in step S1403), the CPU of the server apparatus 201 causes the operation to proceed to step S1404.

In step S1404, the CPU of the server apparatus 201 determines whether a setting file of the distribution-destination image forming apparatus is registered. More specifically, the CPU of the server apparatus 201 determines the model (model name, model-specific ID, etc.) of the distribution-destination image forming apparatus corresponding to the IP address specified in the entry field 902 in FIG. 9 based on information about the models of the image forming apparatuses registered in the HDD of the server apparatus 201. If a setting file of an image forming apparatus corresponding to the determined model is registered in the server apparatus 201, the CPU determines that the setting file of the distribution-destination image forming apparatus is registered. In the table 903 in FIG. 9, if the distribution-destination image forming apparatus 203 is specified and if the setting file 701 of the image forming apparatus 203 (FIG. 7) is registered as illustrated in the line 805 in FIG. 8, the CPU of the server apparatus 201 determines that a setting file of the distribution-destination image forming apparatus has already been registered. The setting file of the distribution-destination image forming apparatus is determined by determining whether a specially defined value ("00000000-0000-0000-0000-000000000000") specifying that a setting operation target is a group of setting values set in the image forming apparatus main body as the application ID (@ApplicationIds:) in the setting file is set and whether a model-specific ID allocated to each distribution-destination image forming apparatus model is set as the version name (@ApplicationVersion:) of the application 301.

In step S1404, if the CPU determines that a setting file of the distribution-destination image forming apparatus is not registered in the server apparatus 201 (NO in step S1404), the CPU of the server apparatus 201 causes the operation to proceed to step S1499.

In step S1499, the CPU of the server apparatus 201 displays an error message as illustrated in FIG. 15 on a screen, cancels the request, and terminates the process of the flow chart.

FIG. 15 illustrates an error message displayed on a display device displaying the operation screen 901 in FIG. 9.

In step S1404, if the CPU determines that a setting file of the distribution-destination image forming apparatus is registered in the server apparatus 201 (YES in step S1404), the CPU of the server apparatus 201 causes the operation to proceed to step S1405.

In step S1405, the CPU of the server apparatus 201 reads the setting file of the distribution-destination image forming apparatus, attaches the read setting file to the distribution request, and causes the operation to proceed to step S1406.

In step S1403, if the CPU determines that the line "@RequireSystemSettings:" is not set to "true" in the setting file part decoded in step S1402 (NO in step S1403), the CPU of the server apparatus 201 causes the operation to proceed to step S1406.

Next, in step S1406, the CPU of the server apparatus 201 attaches the setting file (for example, the setting data 1301 in FIG. 13) selected in the table 903 in FIG. 9 to the distribution request and causes the operation to proceed to step S1407.

More specifically, if the CPU determines YES in step S1403, the CPU attaches the setting file 701 of the distribution-destination image forming apparatus and the extracted setting data 1301 to the distribution request. However, if the CPU determines NO in step S1403, the CPU attaches only the extracted setting data 1301 to the distribution request, without attaching a setting file for the distribution-destination image forming apparatus.

Next, in step S1407, the CPU of the server apparatus 201 transmits the distribution request to which the above setting file has been attached to the agent 303 of the image forming apparatus (second image forming apparatus, for example, the image forming apparatus 203) corresponding to the IP address specified in the entry field 902 in FIG. 9. Next, the CPU terminates the process of the flow chart.

Figure 16B:
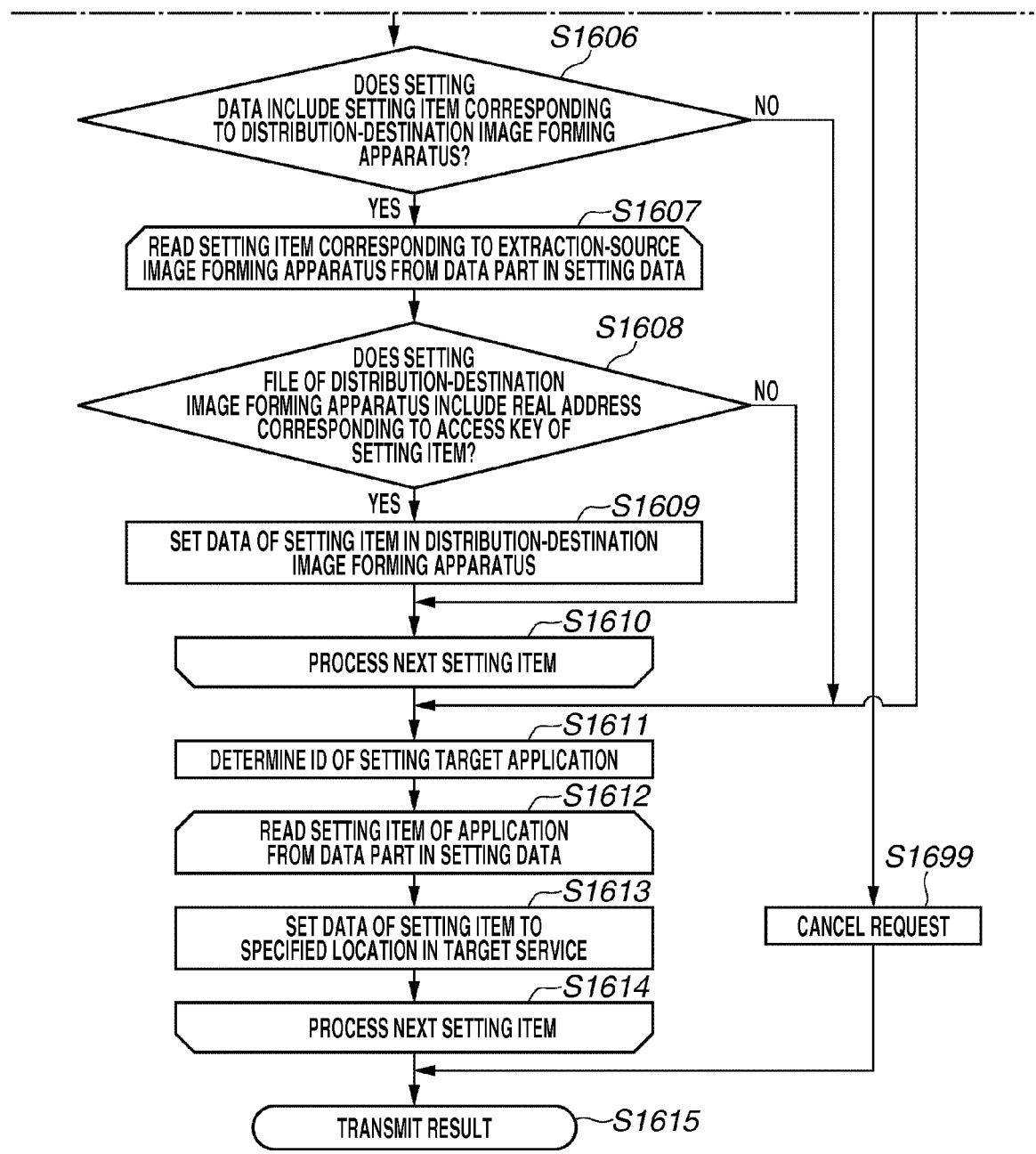
FIG. 16, which is composed of FIGS. 16A and 16B, is a flow chart illustrating a process executed by an agent of an image forming apparatus that has received a distribution request from the server apparatus.

Next, a process in which the agent 303 of the image forming apparatus processes the distribution request transmitted from the server apparatus 201 in step S1407 in FIG. 14 will be described with reference to FIG. 16, which is composed of FIGS. 16A and 16B.

FIG. 16 is a flow chart illustrating a process executed by the agent 303 of the image forming apparatus that has received the distribution request from the server apparatus 201. The process of the flow chart is executed by the agent 303 of the image forming apparatus. More specifically, the process of the flow chart is realized by causing the CPU 103 of the image forming apparatus to read and execute a computer-readable program stored in the HDD 107.

First, in step S1601, the agent 303 of the image forming apparatus receives the distribution request and causes the operation to proceed to step S1602. As illustrated in FIG. 14, the setting data 1301 (FIG. 13) including the extracted data is attached to the request.

In step S1602, the agent 303 reads and decodes the setting file part 1304 of the application 301 from the setting data 1301 attached to the distribution request. For example, the decoded setting file part 1304 appears similar to the setting file 501 in FIG. 5.

Next, in step S1603, the agent 303 determines whether the line "@RequireSystemSettings:" is registered in the setting file part 1304 decoded in step S1602 and "true" is set.

In step S1603, if the agent 303 determines that the line "@RequireSystemSettings:" is not set to "true" in the setting file part 1304 (NO in step S1603), the agent 303 causes the operation to proceed to step S1611. In such case, since there is no need to change settings of the image forming apparatus main body, the agent 303 skips steps S1604 to S1610 for changing settings of the image forming apparatus main body.

However, in step S1603, if the agent 303 determines that the line "@RequireSystemSettings:" is set to "true" in the setting file part 1304 (YES in step S1603), the agent 303 causes the operation to proceed to step S1604.

In step S1604, the agent 303 determines whether a setting file of the distribution-destination image forming apparatus is attached to the distribution request. This determination is made by determining whether a setting file in which a specially defined value (@ApplicationIds:00000000-0000-0000-0000-000000000000) specifying that a setting operation target is a group of setting values set in the image forming apparatus main body is set as application ID is attached.

In step S1604, if the agent 303 determines that a setting file of the distribution-destination image forming apparatus is not attached to the distribution request (NO in step S1604), the agent 303 causes the operation to proceed to step S1699. In step S1699, the agent 303 cancels the distribution request. In step S1615, the agent 303 transmits the processing result (NG in this case) to the server apparatus 201 and terminates the process of the flow chart.

On the other hand, in step S1604, if the agent 303 determines that a setting file of the distribution-destination image forming apparatus is attached to the distribution request (YES in step S1604), the agent 303 causes the operation to proceed to step S1605.

In step S1605, the agent 303 determines whether the setting file attached to the distribution request corresponds to the distribution-destination image forming apparatus. More specifically, the agent 303 determines whether the model-specific ID of the image forming apparatus on which the agent 303 is operating matches the value in the line "@Application-Version:" in the setting file of the image forming apparatus attached to the distribution request. This line specifies the model-specific ID of the image forming apparatus to which the setting file of the image forming apparatus is directed and corresponds to the line 604 in FIG. 6 and the line 704 in FIG. 7. In addition, the model-specific ID of the distribution-destination image forming apparatus is stored in the HDD of the image forming apparatus, for example. If the model-specific ID in the above line in the setting file matches the model-specific ID stored in the HDD 107 of the distribution-destination image forming apparatus (YES in step S1605), the agent 303 determines that the setting file of the image forming apparatus attached to the request corresponds to the distribution-destination image forming apparatus.

In step S1605, if the setting file attached to the above distribution request does not correspond to the distribution-destination image forming apparatus (the model-specific IDs do not match) (NO in step S1605), the agent 303 determines that an unauthorized setting file has been specified. As a result, the agent 303 causes the operation to proceed to step S1699. In step S1699, the agent 303 cancels the distribution request. Next, in step S1615, the agent 303 transmits the processing result (NG in this case) to the server apparatus 201 and terminates the process of the flow chart.

On the other hand, in step S1605, if the agent 303 determines that the setting file attached to the distribution request corresponds to the distribution-destination image forming apparatus (model-specific IDs match) (YES in step S1605), the agent 303 causes the operation to proceed to step S1606.

In step S1606, the agent 303 determines whether the setting data 1301 attached to the distribution request includes a setting item corresponding to the distribution-destination image forming apparatus main body. More specifically, in the setting data 1301 attached to the above distribution request, the agent 303 determines whether the ID "00000000-0000-0000-0000-000000000000" specifying the image forming apparatus main body is described in the <id> tag in the <exportdata> tag and whether a group of setting values (the part 1302 in FIG. 13) specifying the model-specific ID of the image forming apparatus on which the agent 303 is operating is described in the <version> tag. If so (YES in step S1606), the agent 303 determines that the setting data 1301 includes a setting item corresponding to the distribution-destination image forming apparatus main body.

In step S1606, if the agent 303 determines that the setting data 1301 does not include a setting item corresponding to the distribution-destination image forming apparatus main body (NO in step S1606), the agent 303 causes the operation to proceed to step S1611.

On the other hand, in step S1606, if the agent 303 determines that the setting data 1301 includes a setting item corresponding to the distribution-destination image forming apparatus main body (YES in step S1606), the agent 303 causes the operation to proceed to step S1607.

In steps S1607 to S1610, the agent 303 reads and analyzes each setting item (information surrounded by each <item> tag in the part 1302 in FIG. 13) corresponding to the image forming apparatus main body in the setting data 1301 and sets each setting item corresponding to the image forming apparatus main body. Next, each step will be described in detail.

First, in step S1607, the agent 303 reads one setting item (information surrounded by an <item> tag) (hereinafter, the current setting item) corresponding to the image forming apparatus main body in the setting data 1301 and causes the operation to proceed to step S1608.

In step S1608, the agent 303 determines whether the access key of the setting item read in step S1607 is registered in the setting file of the distribution-destination image forming apparatus read in step S1605 and whether a real address can be determined.

In step S1608, if the agent 303 determines that the access key is not registered in the setting file of the distribution-destination image forming apparatus or a real address is not determined (NO in step S1608), the agent 303 skips processing of the current setting item and causes the operation to proceed to step S1610.

On the other hand, in step S1608, if the agent 303 determines that the access key is registered in the setting file of the distribution-destination image forming apparatus and a real address is determined (YES in step S1608), the agent 303 causes the operation to proceed to step S1609.

In step S1609, the agent 303 uses the determined real address to set the data type and value set in the current setting item in the image forming apparatus main body on which the agent 303 is operating and causes the operation to proceed to step S1610.

In step S1610, the agent 303 sets the next setting item to the current setting item and causes the operation to return to step S1607.

In step S1610, if the agent 303 determines that the next setting item does not exist, the agent 303 determines that setting the distribution-destination image forming apparatus main body is completed. As a result, the agent 303 causes the operation to proceed to step S1611.

The process for setting each setting item of the image forming apparatus in steps S1617 to S1610 will be described more specifically, assuming that the setting file attached to the distribution request is the setting data 1301 in FIG. 13 and the setting data of the distribution-destination image forming apparatus is the setting file 701 in FIG. 7.

For example, in the setting data 1301, the access key "sys/auth/ils" is specified in the item in lines 1312 to 1314. With this access key, if a definition in the setting file 701 is searched, the line 707 is acquired. It is seen that the real address "ils:///" is specified in this line 707. The real address "ils:///" specifies to allocate an account ID to each application in the image forming apparatus. Thus, the value in the line 1314 is allocated to the application 301 as an account ID.

In addition, the access key "sys/dev/print/outtray" is specified in lines 1315 to 1317. With this access key, if a definition in the setting file 701 is searched, the line 708 is acquired. It is seen that the real address "pos://0.2.0.1" is specified in the line 708. Thus, this real address and data "1" in the line 1317 are specified to the SCM 305 to update setting data of the image forming apparatus 203 main body. In this way, the items specified in lines 1318 to 1320 and lines 1321 to 1323 are similarly processed.

Next, in step S1611, the agent 303 reads an application ID (information surrounded by an <id> tag, that is, the line 1351 in FIG. 13) in the setting data part of the application 301 (the part 1303 in FIG. 13) from the setting data 1301 attached to the above distribution request, to determine the ID of the setting target application.

Next, in steps S1612 to S1614, the agent 303 reads and analyzes each setting item of the application in the setting data 1301 (information surrounded by each <item> tag in the part 1303 in FIG. 13), to set each setting item of the application. Next, each step will be described in detail.

First, in step S1612, the agent 303 reads one setting item (hereinafter, the current setting item) of the application (information surrounded by an <item> tag in the part 1303) from the setting data 1301 and causes the operation to proceed to step S1613.

In step S1613, the agent 303 uses the access key of the setting item read in step S1612, determines a setting target service and a specified location, and sets a value. Next, the agent 303 causes the operation to proceed to step S1614.

In step S1614, the agent 303 sets the next setting item to the current setting item and causes the operation to return to step S1612.

In step S1614, if the agent 303 determines that the next setting item does not exist, the agent 303 determines that setting the setting items of the application 301 is completed and causes the operation to proceed to step S1615. In step S1615, the agent 303 transmits the processing result (OK in this case) to the server apparatus 201 and terminates the process of the flow chart.

Next, the process for setting each setting item of the application in steps S1612 to S1614 will be described more specifically, assuming that the setting file attached to the distribution request is the setting data 1301 in FIG. 13.

For example, the access key "cm/pid/authServer" is specified in the setting item in lines 1352 to 1354. Since the access key starts with "cm", the access key specifies that the setting target is the Config Service 302. More specifically, data "192.168.1.2" in line 1354 is set where pid is "authServer" in the Config Service 302. Similarly, data in the setting items specified in lines 1355 to 1357 and lines 1358 to 1360 is set in the Config Service 302.

As described above, according to the present exemplary embodiment, setting values of an application installed to an image forming apparatus or setting values of the image forming apparatus main body relating to the application can be operated without requiring a complex operation such as installing a migration program in the image forming apparatus for each model, irrespective of the update timing of firmware of the image forming apparatus. In addition, such setting values can be migrated within a single image forming apparatus or among a plurality of different image forming apparatuses flexibly and easily (even among image forming apparatuses of different models).

More specifically, the agent 303 of the image forming apparatus sets a value of a setting item of the application specified by the application ID in the setting file 501. In addition, if a setting item of the image forming apparatus main body relating to the application exists, the agent 303 can set a value of the setting item of the image forming apparatus main body.

In the above description, the second items in the setting file 501 include setting items for extracting setting values of the application installed in the image forming apparatus, setting items for extracting setting values of the image forming apparatus main body relating to the application, and setting values of the image forming apparatus main body relating to the application that are set in the image forming apparatus main body. However, the setting items for extracting the setting values of the image forming apparatus main body and the setting values of the image forming apparatus main body that are set in the image forming apparatus main body included in the second items in the setting file 501 are not limited to the setting items of the image forming apparatus main body relating to the application. The second items in the setting file 501 may include arbitrary setting values or arbitrary setting items for extracting arbitrary setting values, as long as the setting items are about the image forming apparatus main body. In addition, the second items in the setting file 501 may include only setting items for extracting setting values of the image forming apparatus main body and setting values that are set in the image forming apparatus main body, without including setting items for extracting setting values of the application.

In addition, the present exemplary embodiment has been described based on an example where a single setting file 501 includes setting items for extracting setting values of a single application. However, a single setting file 501 may include setting items for extracting setting values of a plurality of applications.

In addition, in the present exemplary embodiment, the setting data 1301 illustrated in FIG. 13 is generated through the process illustrated in FIG. 12. However, the setting data 1301 illustrated in FIG. 13 may be generated by another method, and the process illustrated in FIG. 14 may be generated thereafter.

In addition, in the present exemplary embodiment, a setting file of an application (FIG. 5) and setting files for image forming apparatuses (FIGS. 6 and 7) are supplied from the server apparatus 201. However, these setting files may be supplied from the HDD 107 of an image forming apparatus or from a storage device such as a USB memory via the USB controller 110.

In addition, in the present exemplary embodiment, the setting data (FIG. 13) is supplied from the server apparatus 201. However, the setting data (FIG. 13) may be supplied from the HDD 107 of an image forming apparatus or from a storage device such as a USB memory via the USB controller 110.

As described above, in the present exemplary embodiment, the server apparatus reads a setting file of an application and determines whether setting values of an image forming apparatus main body relating to the application need to be set. If such setting values need to be set, the server apparatus determines information about the model of the target image forming apparatus. If the server apparatus includes a setting file of the image forming apparatus, the server apparatus transmits the setting file of the image forming apparatus as a setting value extraction request command to a first image forming apparatus, along with the setting file of the application. Subsequently, the server apparatus receives setting value data from the first image forming apparatus. In addition, the server apparatus distributes the setting value data to a second image forming apparatus.

Conventionally, an application in an image forming apparatus and a part of an image forming apparatus main body are simultaneously set by different operations. In such conventional way, the user is required to execute a complex operation and wastes time. As a result, the user could be oblivious to setting the items of the image forming apparatus that need to be set simultaneously with the application. However, the present exemplary embodiment solves such problems. More specifically, setting values of the application installed in the image forming apparatus or setting values of the image forming apparatus main body relating to the application can be operated without requiring a complex operation such as installing a migration program in the image forming apparatus for each model, irrespective of the update timing of firmware of the image forming apparatus. In addition, such setting values can be migrated within a single image forming apparatus or among a plurality of different image forming apparatuses flexibly and easily (even among image forming apparatuses of different models).

The configurations and contents of various types of data are not limited to those in the above description. It is needless to say that the data may have various configurations or contents, depending on the use or the purpose.

While an exemplary embodiment has thus been described, for example, the present invention can be applied to a system, an apparatus, a method, a program, or a storage medium as an exemplary mode. More specifically, the present invention can be applied to a system including a plurality of devices or to an apparatus including a device.

In addition, the present invention includes a combination of various exemplary embodiments.

In addition, the present invention can be applied to a system including a plurality of devices or to an apparatus including a device.

The present invention is not limited to the above exemplary embodiment. Various variations (including an organic combination of various exemplary embodiments) are possible based on the gist of the present invention, and the scope of the present invention includes such variations. Thus, the present invention includes the above exemplary embodiment and various combinations of variations of the above exemplary embodiment.

Aspects of the present invention can also be realized by a computer of a system or apparatus (or devices such as a CPU or a micro-processing unit (MPU) which may also be referred to as a microprocessor) that reads out and executes a program recorded on a memory device to perform the functions of one or more of the above-described embodiment(s) of the present invention, and by a method, the steps of which are performed by a computer of a system or apparatus by, for example, reading out and executing a program recorded on a memory device to perform the functions of one or more of the above-described embodiment(s) of the present invention. The program can be provided to the computer, for example, via a network or from a recording medium of various types serving as the memory device (e.g., non-transitory computer-readable medium). The computer-readable medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-013801 filed Jan. 26, 2012, which is hereby incorporated by reference herein in its entirety.

What is claimed is:

1. A management system comprising:
a server apparatus; and
at least one image forming apparatus configured to be capable of installing at least one application thereon,
wherein the server apparatus and the at least one image forming apparatus are capable of communicating with each other,
wherein the server apparatus comprises a setting file transmission unit configured to transmit at least one setting file including a first item for specifying an application and a second item for specifying an operation target setting content to any one of the at least one image forming apparatus, and
wherein each of the at least one image forming apparatus comprises:
a reception unit configured to receive at least one setting file including a first item for specifying an application and a second item for specifying an operation target setting content from the server apparatus;
an operation unit configured to operate, if a predetermined value defined for operating a setting value of the image forming apparatus, the predetermined value being different from a setting value for specifying an application, is set in the first item included in the received setting file, the setting value of the image forming apparatus by using a value set in the second item included in the received setting file; and
a transmission unit configured to transmit a result of an operation by the operation unit to the server apparatus,
wherein, when the reception unit receives a first setting file and a second setting file from the server apparatus, the operation unit is configured to operate, if a value specifying that an operation of a setting value of an image forming apparatus is needed is set in the first setting file setting a value specifying an application in the first item and the predetermined value is set in the first item included in the second setting file, the setting value of the image forming apparatus according to the second setting file simultaneously with an operation to a setting value of the application according to the first setting file.

2. The management system according to claim 1, wherein, when the setting file transmission unit transmits a setting file including the first item in which a value specifying an application and a value specifying that an operation of a setting value of an image forming apparatus is needed are set, the setting file transmission unit further transmits a setting file including the first item in which the predetermined value is set, and
wherein, if the operation unit receives a setting file including the first item in which a value specifying an application and a value specifying that an operation of a setting value of an image forming apparatus is needed are set and the operation unit receives a setting file including the first item in which the predetermined value is set, then when the operation unit operates a setting value of the application, the operation unit operates the setting value of the image forming apparatus, the setting value being different from the setting value of the application, according to the two setting files.

3. The management system according to claim 1 wherein the setting file including the first item in which the predetermined value is set includes a value specifying a model of an operation target image forming apparatus.

4. The management system according to claim 1, wherein the operation unit extracts a setting value according to the received setting file.

5. The management system according to claim 1, wherein, when the setting file transmission unit transmits a setting file specifying an operation of setting a setting value to any one of the at least one image forming apparatus, the setting file transmission unit further transmits a setting value extracted from the same image forming apparatus or a different image forming apparatus, and
wherein, when the operation unit sets a setting value according to the received setting file, the operation unit receives a setting value extracted from the same image forming apparatus or a different image forming apparatus from the server apparatus.

6. An image forming apparatus capable of communicating with a server apparatus and installing at least one application thereon, the image forming apparatus comprising:
a reception unit configured to receive at least one setting file including a first item for specifying an application and a second item for specifying an operation target setting content from the server apparatus;
an operation unit configured to operate, if a predetermined value defined for operating a setting value of the image forming apparatus, the predetermined value being different from a setting value for specifying an application, is set in the first item included in the received setting file, the setting value of the image forming apparatus by using a value set in the second item included in the received setting file; and
a transmission unit configured to transmit a result of an operation by the operation unit to the server apparatus,
wherein, when the reception unit receives a first setting file and a second setting file from the server apparatus, the operation unit is configured to operate, if a value specifying that an operation of a setting value of an image forming apparatus is needed is set in the first setting file setting a value specifying an application in the first item and the predetermined value is set in the first item included in the second setting file, the setting value of the image forming apparatus according to the second setting file simultaneously with an operation to a setting value of the application according to the first setting file.

7. The image forming apparatus according to claim 6, wherein if the operation unit receives a setting file including the first item in which a value specifying an application and a value specifying that an operation of a setting value of an image forming apparatus is needed are set and the operation unit receives a setting file including the first item in which the predetermined value is set, then when the operation unit operates a setting value of the application, the operation unit operates the setting value of the image forming apparatus, the setting value being different from the setting value of the application, according to the two setting files.

8. The image forming apparatus according to claim 6, wherein the setting file including the first item in which the predetermined value is set includes a value specifying a model of an operation target image forming apparatus.

9. The image forming apparatus according to claim 6, wherein the operation unit extracts a setting value according to the received setting file.

10. The image forming apparatus according to claim 6, wherein, when the operation unit sets a setting value according to the received setting file, the operation unit receives a setting value extracted from the same image forming apparatus or a different image forming apparatus from the server apparatus.

11. A method for controlling a management system including a server apparatus and at least one image forming apparatus configured to be capable of installing at least one application thereon, the server apparatus and the at least one image forming apparatus being capable of communicating with each other, the method comprising:

transmitting, via the server apparatus, at least one setting file including a first item for specifying an application and a second item for specifying an operation target setting content to any one of the at least one image forming apparatus;

receiving, via the at least one image forming apparatus, at least one setting file including a first item for specifying an application and a second item for specifying an operation target setting content from the server apparatus;

operating, if a predetermined value defined for operating a setting value of the image forming apparatus, the predetermined value being different from a setting value for specifying an application, is set in the first item included in the received setting file, the setting value of the image forming apparatus by using a value set in the second item included in the received setting file; and transmitting, via the at least one image forming apparatus, a result of the operation to the server apparatus, wherein, when the receiving receives a first setting file and a second setting file from the server apparatus, the operating operates, if a value specifying that an operation of a setting value of an image forming apparatus is needed is set in the first setting file setting a value specifying an application in the first item and the predetermined value is set in the first item included in the second setting file, the setting value of the image forming apparatus according to the second setting file simultaneously with an operation to a setting value of the application according to the first setting file.

12. A method for controlling an image forming apparatus capable of communicating with a server apparatus and installing at least one application thereon, the method comprising:

receiving at least one setting file including a first item for specifying an application and a second item for specifying an operation target setting content from the server apparatus;

operating, if a predetermined value defined for operating a setting value of the image forming apparatus, the predetermined value being different from a setting value for specifying an application, is set in the first item included in the received setting file, the setting value of the image forming apparatus by using a value set in the second item included in the received setting file; and transmitting a result of the operation to the server apparatus, wherein, when the receiving receives a first setting file and a second setting file from the server apparatus, the operating operates, if a value specifying that an operation of a setting value of an image forming apparatus is needed is set in the first setting file setting a value specifying an application in the first item and the predetermined value is set in the first item included in the second setting file, the setting value of the image forming apparatus according to the second setting file simultaneously with an operation to a setting value of the application according to the first setting file.

13. A computer-readable non-transitory storage medium storing a computer program that causes a computer to execute a method for an image forming apparatus that is capable of communicating with a server apparatus and installing at least one application thereon, the method comprising:

receiving at least one setting file including a first item for specifying an application and a second item for specifying an operation target setting content from the server apparatus;

operating, if a predetermined value defined for operating a setting value of the image forming apparatus, the predetermined value being different from a setting value for specifying an application, is set in the first item included in the received setting file, the setting value of the image forming apparatus by using a value set in the second item included in the received setting file; and transmitting a result of the operation to the server apparatus, wherein, when the receiving receives a first setting file and a second setting file from the server apparatus, the operating operates, if a value specifying that an operation of a setting value of an image forming apparatus is needed is set in the first setting file setting a value specifying an application in the first item and the predetermined value is set in the first item included in the second setting file, the setting value of the image forming apparatus according to the second setting file simultaneously with an operation to a setting value of the application according to the first setting file.

\* \* \* \* \*